US011774357B2

(12) United States Patent
Takahashi et al.

(10) Patent No.: US 11,774,357 B2
(45) Date of Patent: Oct. 3, 2023

(54) TERAHERTZ WAVE ATTENUATED TOTAL REFLECTION SPECTROSCOPIC METHOD, TERAHERTZ WAVE ATTENUATED TOTAL REFLECTION SPECTROSCOPIC DEVICE, AND PRESSURE APPLICATION DEVICE

(71) Applicant: HAMAMATSU PHOTONICS K.K., Hamamatsu (JP)

(72) Inventors: Kazuhiro Takahashi, Hamamatsu (JP); Kouichiro Akiyama, Hamamatsu (JP); Hiroshi Satozono, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/474,338

(22) Filed: Sep. 14, 2021

(65) Prior Publication Data

US 2022/0091027 A1 Mar. 24, 2022

(30) Foreign Application Priority Data

Sep. 23, 2020 (JP) .................................. 2020-158609

(51) Int. Cl.
*G01N 21/35* (2014.01)
*G01N 21/3563* (2014.01)
*G01N 21/552* (2014.01)

(52) U.S. Cl.
CPC ....... *G01N 21/3563* (2013.01); *G01N 21/552* (2013.01)

(58) Field of Classification Search
CPC .......................... G01N 21/3563; G01N 21/552
See application file for complete search history.

(56) References Cited

U.S. PATENT DOCUMENTS

| 10,451,480 B2 | 10/2019 | Smith | |
| 2010/0091266 A1* | 4/2010 | Yasuda | G01N 21/552 356/51 |
| 2016/0069673 A1* | 3/2016 | Takayanagi | G01B 11/0641 250/339.11 |
| 2017/0336259 A1* | 11/2017 | Kawada | G01J 3/0224 |

FOREIGN PATENT DOCUMENTS

| CN | 111504941 A | 8/2020 |
| JP | 2008-224451 A | 9/2008 |
| WO | WO 2014/005987 A1 | 1/2014 |
| WO | WO 2019/153460 A1 | 8/2019 |

* cited by examiner

*Primary Examiner* — Hugh Maupin
(74) *Attorney, Agent, or Firm* — Faegre Drinker Biddle & Reath LLP

(57) ABSTRACT

A terahertz wave attenuated total reflection spectroscopic method, includes: a first step of disposing a measurement target of which a volume is changed during a measurement period on a reflection surface; and a second step of acquiring data including a plurality of detection results respectively corresponding to a plurality of times separated from each other during the measurement period by allowing a terahertz wave to be incident on the reflection surface from a side opposite to the measurement target and by detecting the terahertz wave reflected on the reflection surface, during the measurement period. In the second step, a state in which a substantially constant pressure is applied to the measurement target disposed on the reflection surface is maintained during the measurement period.

16 Claims, 15 Drawing Sheets

TERAHERTZ WAVE ATTENUATED TOTAL REFLECTION SPECTROSCOPIC METHOD, TERAHERTZ WAVE ATTENUATED TOTAL REFLECTION SPECTROSCOPIC DEVICE, AND PRESSURE APPLICATION DEVICE

TECHNICAL FIELD

The present disclosure relates to a terahertz wave attenuated total reflection spectroscopic method, a terahertz wave attenuated total reflection spectroscopic device, and a pressure application device.

BACKGROUND

In Japanese Unexamined Patent Publication No. 2008-224451, a terahertz wave measurement device that allows a terahertz wave to be incident on a reflection surface of a prism from a side opposite to a measurement target and detects the terahertz wave reflected on the reflection surface of the prism, in a state where the measurement target is disposed on the reflection surface of the prism, is described as a terahertz wave attenuated total reflection device. In the terahertz wave measurement device described in Japanese Unexamined Patent Publication No. 2008-224451, the measurement target is pressed against the reflection surface of the prism, and thus, efficient measurement is attained.

SUMMARY

However, in the measurement of a temporal change in the measurement target, when the volume of the measurement target is changed during a measurement period, there is a concern that information relevant to the measurement target is not capable of being acquired with excellent reproducibility.

An object of the present disclosure is to provide a terahertz wave attenuated total reflection spectroscopic method, a terahertz wave attenuated total reflection spectroscopic device, and a pressure application device, in which even in the case of a measurement target of which the volume is changed during a measurement period, information relevant to the measurement target can be acquired with excellent reproducibility.

A terahertz wave attenuated total reflection spectroscopic method of one aspect of the present disclosure, includes: a first step of disposing a measurement target of which a volume is changed during a measurement period on a reflection surface; and a second step of acquiring data including a plurality of detection results respectively corresponding to a plurality of times separated from each other during the measurement period by allowing a terahertz wave to be incident on the reflection surface from a side opposite to the measurement target and by detecting the terahertz wave reflected on the reflection surface, during the measurement period. In the second step, a state in which a substantially constant pressure is applied to the measurement target disposed on the reflection surface is maintained during the measurement period.

DETAILED DESCRIPTION

Figure 1:
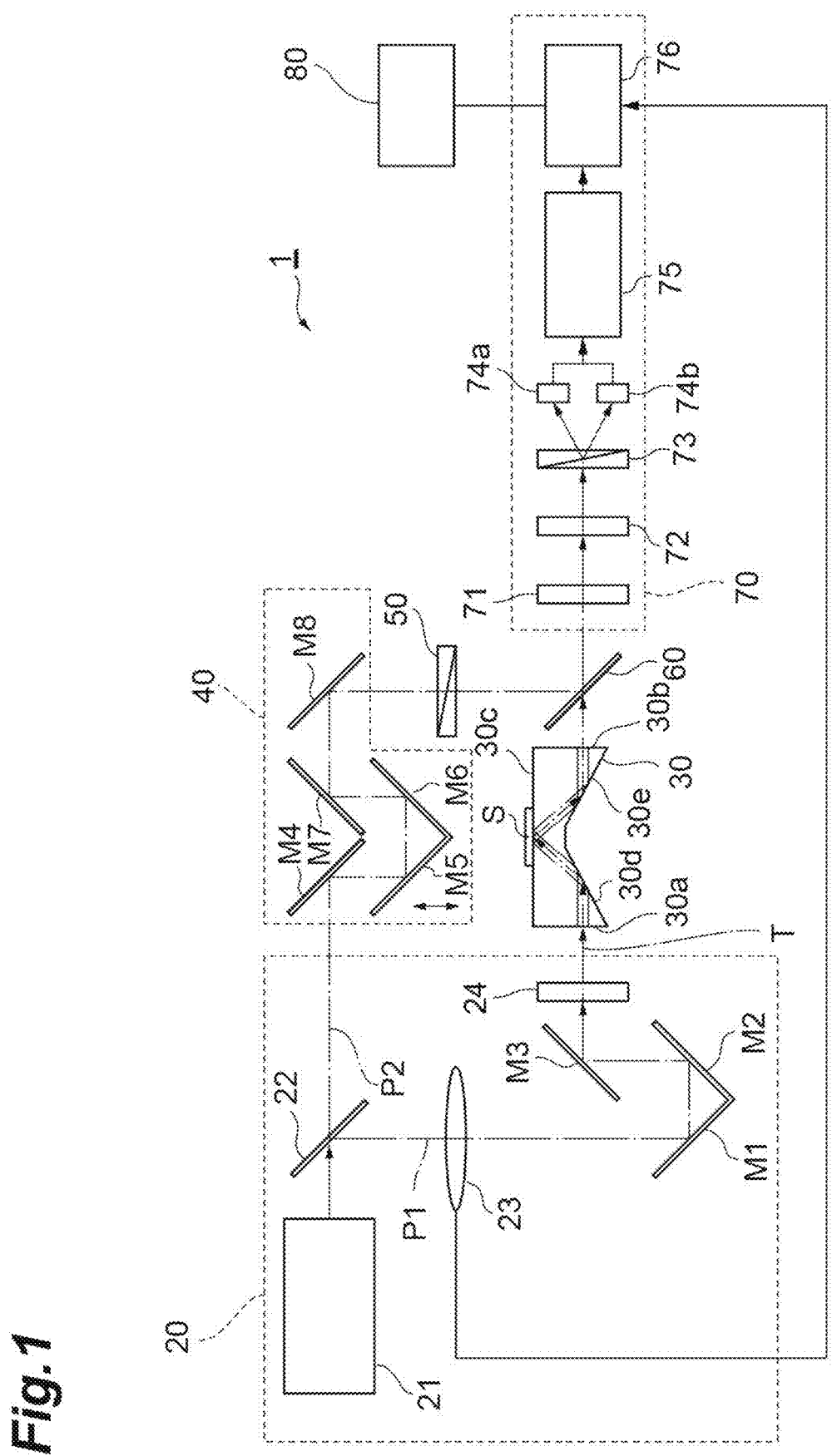
FIG. 1 is a configuration diagram of a terahertz wave attenuated total reflection spectroscopic device of one embodiment.

Hereinafter, an embodiment of the present invention will be described in detail with reference to the drawings. Note that, in each of the drawings, the same reference numerals will be applied to the same or corresponding parts, and the repeated description will be omitted.

[Terahertz Wave Attenuated Total Reflection Spectroscopic Device]

As illustrated in FIG. 1, a terahertz wave attenuated total reflection spectroscopic device 1 includes an output unit (a terahertz wave output unit) 20, a prism 30, an optical path length difference adjustment unit 40, a polarizer 50, a multiplexing unit 60, a detection unit (a terahertz wave detection unit) 70, and a processing unit 80. The terahertz wave attenuated total reflection spectroscopic device 1 is a device for implementing a method of attenuated total reflection spectroscopy (ATR) using a terahertz wave. Hereinafter, the "terahertz wave attenuated total reflection spectroscopic device 1" will be referred to as an "ATR device 1".

The output unit 20 outputs a terahertz wave T. Specifically, the output unit 20 includes a light source 21, a branching unit 22, a chopper 23, a plurality of mirrors M1 to M3, and a terahertz wave generating element 24. The light source 21 outputs light by pulsed oscillation. The light source 21, for example, is a femtosecond pulsed laser light source outputting pulsed laser light having a pulse width of approximately femtoseconds. The branching unit 22, for example, is a beam splitter and the like. The branching unit 22 allows the light output from the light source 21 to branch into pump light P1 and probe light P2. The chopper 23 alternately repeats the passing and blocking of the pump light P1 output from the branching unit 22 at a constant cycle.

Each of the mirrors M1 to M3 sequentially reflects the pump light P1 passing through the chopper 23. The pump light P1 passing through the chopper 23 is sequentially reflected on each of the mirrors M1 to M3, and then, is incident on the terahertz wave generating element 24. Note that, hereinafter, an optical system of the pump light P1 reaching the terahertz wave generating element 24 from the branching unit 22 will be referred to as a "pump optical system".

The terahertz wave generating element 24 outputs the terahertz wave T by the incidence of the pump light P1 reflected on the mirror M3. The terahertz wave generating element 24, for example, includes non-linear optical crystals (for example, ZnTe), a photoconductive antenna element (for example, an optical switch using GaAs), a semiconductor (for example, InAs), or a superconductor. In a case where the terahertz wave generating element 24 includes the non-linear optical crystals, the terahertz wave generating element 24 generates the terahertz wave T by a non-linear optical phenomenon that occurs due to the incidence of the pump light P1.

The terahertz wave T is an electromagnetic wave having a frequency of approximately 0.01 THz to 100 THz corresponding to an intermediate region between an optical wave and an electric wave and has intermediate properties between the optical wave and the electric wave. The terahertz wave T is generated at a constant repeated cycle and has a pulse width of approximately several picoseconds. That is, the terahertz wave generating element 24 generates pulse light arrays including a plurality of terahertz waves T arranged at a predetermined time interval (pulse interval). Note that, hereinafter, an optical system of the terahertz wave T reaching the multiplexing unit 60 from the terahertz wave generating element 24 will be referred to as a "terahertz wave optical system".

The prism 30, for example, is a so-called stigmatic prism and the like. The prism 30 includes an incidence surface 30a, an exit surface 30b, a reflection surface 30c, and a first secondary reflection surface 30d and a second secondary reflection surface 30e. The incidence surface 30a and the exit surface 30b are parallel to each other. The reflection surface 30c is perpendicular to the incidence surface 30a and the exit surface 30b. A measurement target S is disposed on the reflection surface 30c. The first secondary reflection surface 30d and the second secondary reflection surface 30e are the surface of the prism 30 on a side opposite to the reflection surface 30c and form a concave portion. The surface including the first secondary reflection surface 30d and the second secondary reflection surface 30e is recessed toward the reflection surface 30c.

The prism 30 is transparent with respect to the terahertz wave T output from the terahertz wave generating element 24. A refractive index of the prism 30 is higher than a refractive index of the measurement target S. The material of the prism 30, for example, is silicon and the like.

The terahertz wave T incident on the incidence surface 30a of the prism 30 is sequentially reflected on the first secondary reflection surface 30d, the reflection surface 30c, and the second secondary reflection surface 30e, and then, is output to the outside from the exit surface 30b. Accordingly, information of a terahertz wave band relevant to the measurement target S can be acquired by detecting an attenuated reflective index of an evanescent wave that is leaked when the terahertz wave T is totally reflected on the reflection surface 30c.

The measurement target S, for example, is a mixture containing an anhydrate (for example, a theophylline anhydrate), water and a dispersant. The anhydrate of the measurement target S, for example, is a powder and the like. In the measurement target S, the anhydrate is transitioned to a hydrate. That is, the measurement target S is accompanied by a hydration transition reaction. The volume of the measurement target S decreases during the measurement period. In this embodiment, information relevant to the measurement target S is information indicating a progress degree of the hydration transition reaction of the measurement target S.

The optical path length difference adjustment unit 40 includes a plurality of mirrors M4 to M8. The probe light P2 output from the branching unit 22 is sequentially reflected on each of the mirrors M4 to M8, and then, passes through the polarizer 50, and is incident on the multiplexing unit 60. Note that, hereinafter, an optical system of the probe light P2 reaching the multiplexing unit 60 from the branching unit 22 will be referred to as a "probe optical system". In the optical path length difference adjustment unit 40, the mirrors M5 and M6 are moved, and thus, an optical path length between the mirror M4 and the mirror M5 and an optical path length between the mirror M6 and the mirror M7 are adjusted, and an optical path length of the probe optical system is adjusted. Accordingly, the optical path length difference adjustment unit 40 adjusts a difference between an "optical path of the pump optical system and the terahertz wave optical system reaching the multiplexing unit 60 from the branching unit 22" and an "optical path of the probe optical system reaching the multiplexing unit 60 from the branching unit 22".

In a case where the terahertz wave T output from the exit surface 30b of the prism 30 and the probe light P2 passing through the polarizer 50 are incident on the multiplexing unit 60, the multiplexing unit 60 multiplexes the terahertz wave T and the probe light P2 to be coaxially output to the detection unit 70. The multiplexing unit 60, for example, is a film-shaped mirror or the like that adheres to a rigid support frame and is thinly stretched. The multiplexing unit 60, for example, is a pellicle and the like.

The detection unit 70 detects the terahertz wave T output from the prism 30. Specifically, the detection unit 70 includes a terahertz wave detection element 71, a ¼ wavelength plate 72, a polarization separation element 73, a light detector 74a, a light detector 74b, a differential amplifier 75, and a lock-in amplifier 76. In a case where the terahertz wave T and the probe light P2 output from the multiplexing unit 60 are incident on the terahertz wave detection element 71, the terahertz wave detection element 71 detects a correlation between the terahertz wave T and the probe light P2.

Specifically, the terahertz wave detection element 71 includes electrooptical crystals. In a case where the terahertz wave T and the probe light P2 are incident on the terahertz wave detection element 71, in the terahertz wave detection element 71, birefringence is induced by a Pockels effect with the propagation of the terahertz wave T. A polarization state of the probe light P2 is changed by the birefringence, and the probe light P2 is output from the terahertz wave detection element 71. At this time, a birefringence amount depends on electrical field intensity of the terahertz wave T. For this reason, a change amount of the polarization state of the probe light P2 in the terahertz wave detection element 71 depends on electrical field intensity of the terahertz wave T.

The probe light P2 output from the terahertz wave detection element 71 passes through the ¼ wavelength plate 72 and is incident on the polarization separation element 73. The polarization separation element 73, for example, is a Wollaston prism and the like. The polarization separation element 73 outputs the incident probe light P2 by separating the incident probe light P2 into two polarization components that are orthogonal to each other.

Each of the light detector 74a and the light detector 74b, for example, includes a photodiode. The light detector 74a and the light detector 74b detect the power of two polarization components of the probe light P2, and output an electrical signal having a value according to the detected power to the differential amplifier 75.

The differential amplifier 75 inputs the electrical signals output from each of the light detector 74a and the light detector 74b, and outputs an electrical signal having a value according to a difference between the respective electrical signals to the lock-in amplifier 76. The lock-in amplifier 76 synchronously detects the electrical signal output from the differential amplifier 75 at a repetition frequency of the passing and blocking of the pump light P1 in the chopper 23. A signal output from the lock-in amplifier 76 has a value depending on the electrical field intensity of the terahertz wave T. As described above, the detection unit 70 detects the correlation between the terahertz wave T and the probe light P2, and detects an electrical field amplitude of the terahertz wave T.

In a case where the optical path length between the mirror M4 and the mirror M5 and the optical path length between the mirror M6 and the mirror M7 are adjusted, and thus, the optical path length of the probe optical system is adjusted, in the optical path length difference adjustment unit 40, a difference between the timings of each of the terahertz wave T and the probe light P2 input to the terahertz wave detection element 71 is adjusted. As described above, in general, the pulse width of the terahertz wave T is approximately picoseconds, whereas the pulse width of the probe light P2 is approximately femtoseconds. That is, the pulse width of the probe light P2 is a few orders of magnitude narrower than that of the terahertz wave T. Accordingly, an incident timing of the probe light P2 with respect to the terahertz wave detection element 71 is swept by the optical path length difference adjustment unit 40, and thus, a time waveform of the electrical field amplitude of the terahertz wave T (hereinafter, referred to as an "electrical field waveform") is obtained. In a case where the incident timing of the probe light P2 is swept once, an electrical field waveform of one terahertz wave T corresponding to a predetermined time is obtained. In this embodiment, the incident timing of the probe light P2 with respect to the terahertz wave detection element 71 is swept by the optical path length difference adjustment unit 40 a plurality of times. Accordingly, a plurality of electrical field waveforms of the terahertz waves T is obtained. That is, the detection unit 70 acquires data including the plurality of electrical field waveforms (detection results) of the terahertz waves T respectively corresponding to a plurality of times separated from each other.

The processing unit 80 acquires the information relevant to the measurement target S on the basis of the plurality of electrical field waveforms of the terahertz waves T that are acquired by the detection unit 70. Specifically, the processing unit 80 is electrically connected to the detection unit 70. The processing unit 80 is electrically connected to the lock-in amplifier 76. The processing unit 80 obtains a plurality of spectra respectively corresponding to the plurality of electrical field waveforms of the terahertz waves T that are acquired by the detection unit 70. The processing unit 80 acquires the information relevant to the measurement target S on the basis of the plurality of spectra. Accordingly, the ATR device 1 measures a temporal change in the measurement target S. The processing unit 80 includes a central processing unit (CPU), a read only memory (ROM), a random access memory (RAM), and the like.

[Surrounding Structure of Prism]

Figure 2:
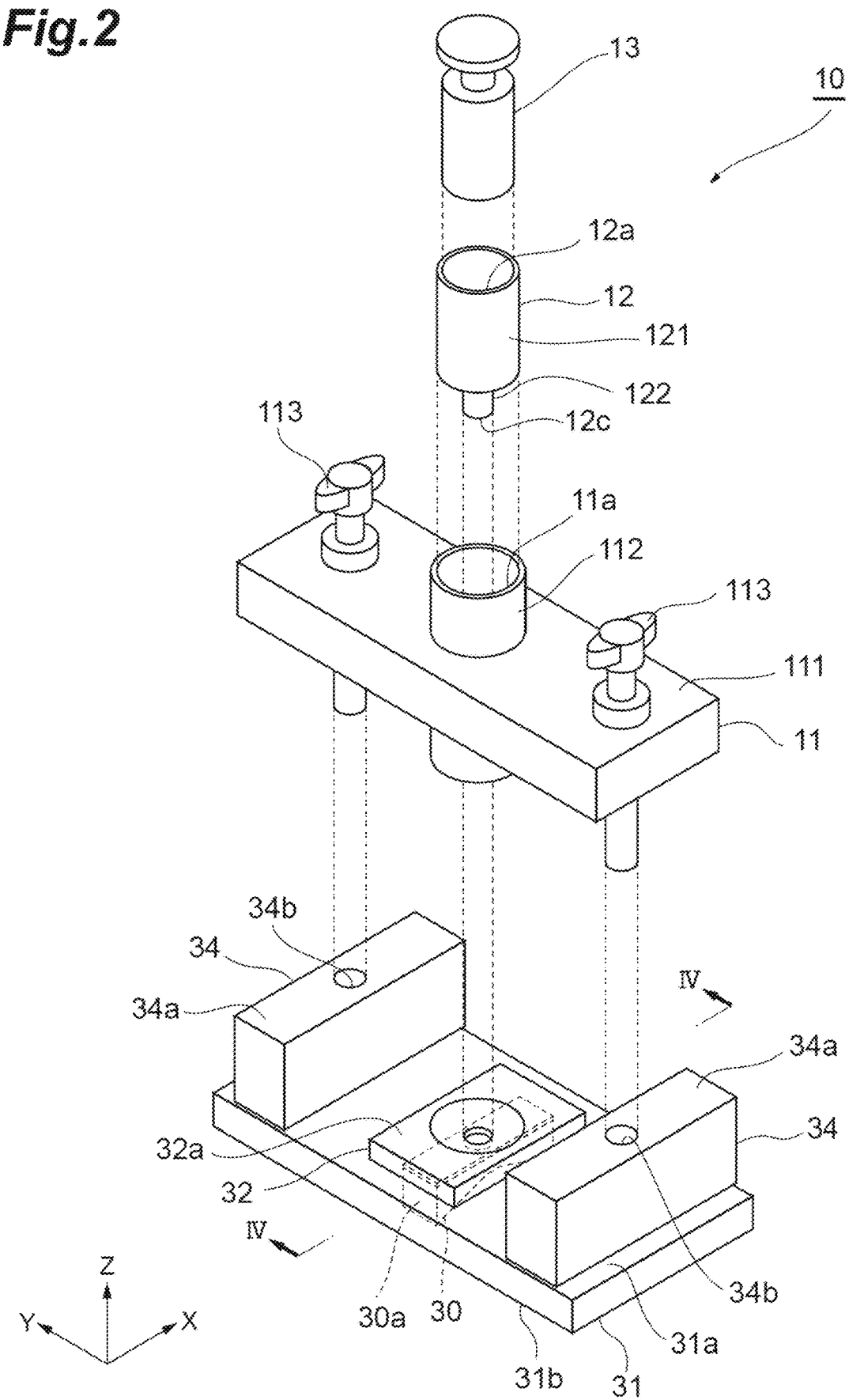
FIG. 2 is an exploded perspective view of a pressure application device of one embodiment.
Figure 3:
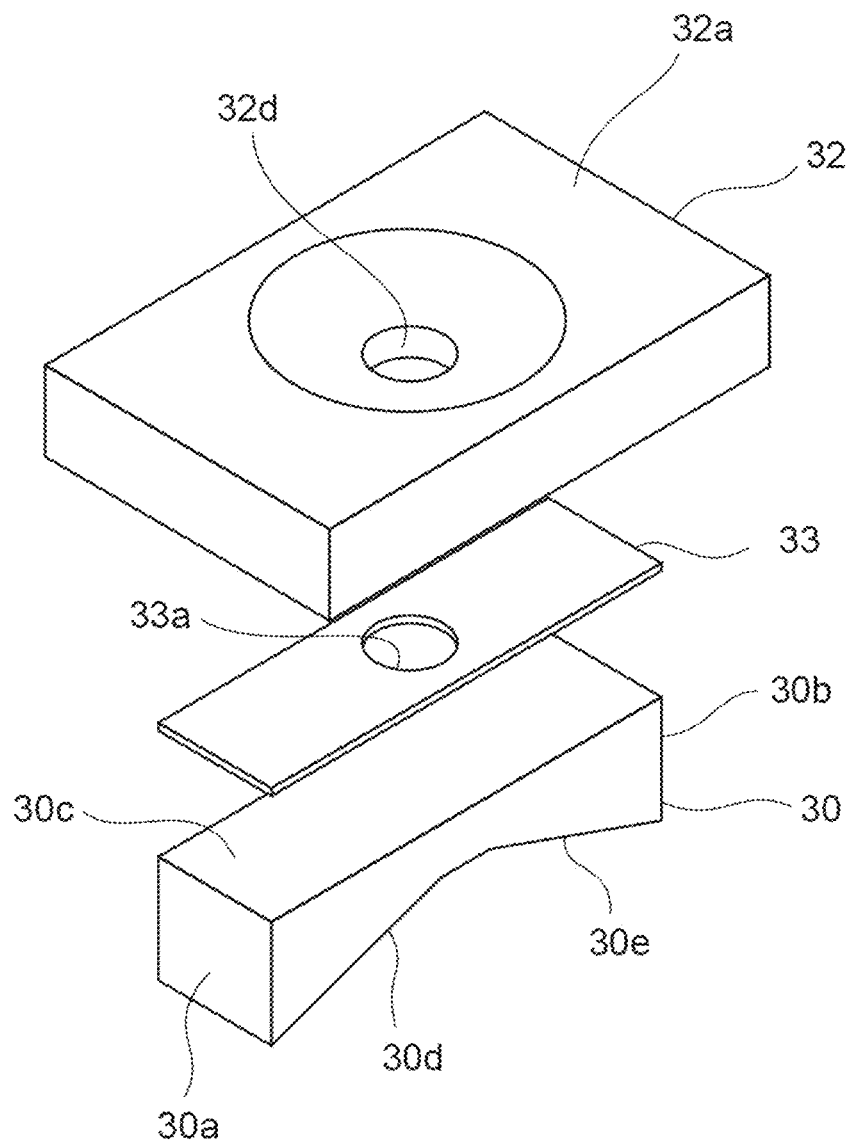
FIG. 3 is an exploded perspective view of a prism illustrated in FIG. 2 and a surrounding structure thereof.

As illustrated in FIG. 2 and FIG. 3, the ATR device 1 further includes a substrate 31, a frame body 32, a sheet 33, a pair of support bodies 34, and a pressure application device (a pressure application unit) 10, as a surrounding structure of the prism 30. Note that, in FIG. 1, such constituents are not illustrated. Hereinafter, a first horizontal direction and a second horizontal direction that are orthogonal to each other indicate an X axis direction and a Y axis direction, respectively, and a vertical direction indicates a Z axis direction.

The substrate 31 retains the prism 30 such that the reflection surface 30c is orthogonal to the Z axis direction, and the incidence surface 30a and the exit surface 30b are orthogonal to the X axis direction. The reflection surface 30c slightly protrudes from a surface 31a of the substrate 31. The reflection surface 30c is approximately parallel to the surface 31a. The incidence of the terahertz wave T with respect to the incidence surface 30a and the exit of the terahertz wave T from the exit surface 30b can be performed on a rear surface 31b side of the substrate 31.

The frame body 32 is disposed on the reflection surface 30c of the prism 30 via the sheet 33. Each of the prism 30 and the sheet 33, for example, is in a rectangle shape in which the X axis direction is a longitudinal direction when viewed from the Z axis direction. The outer edge of the prism 30 is approximately coincident with the outer edge of the sheet 33 when viewed from the Z axis direction. The material of the sheet 33, for example, is silicon rubber and the like. The frame body 32, for example, is in a rectangular plate in which the X axis direction is a longitudinal direction. In the frame body 32 and the sheet 33, a through hole 32d and a through hole 33a are formed, respectively. Each of the through hole 32d and the through hole 33a, for example, is in a circle shape when viewed from the Z axis direction.

The pair of support bodies 34 are fixed to the surface 31a of the substrate 31. Each of the pair of support bodies 34 is disposed on both sides of the prism 30 and the frame body 32 in the Y axis direction when viewed from the X axis direction. The support body 34, for example, is in a rectangle shape in which the X axis direction is a longitudinal direction when viewed from the Z axis direction. The height of the support body 34 is greater than a distance between the surface 32a of the frame body 32 and the surface 31a of the substrate 31. A hole 34b is formed in a surface 34a of the support body 34 on a side opposite to the substrate 31.

The pressure application device 10 includes a support portion 11, a contact portion 12, and a biasing portion 13. The support portion 11 includes a plate body 111, a cylindrical body 112, and a pair of fixing portions 113. The plate body 111, for example, is in a rectangular plate in which the Y axis direction is a longitudinal direction. A thickness direction of the plate body 111 is parallel to the Z axis direction. The cylindrical body 112 extends along the Z axis direction. The cylindrical body 112 penetrates through the plate body 111. Both ends of the cylindrical body 112 protrude from the surface and the rear surface of the plate body 111, respectively. The plate body 111 and the cylindrical body 112 are fixed to each other.

The pair of fixing portions 113 are provided in both end portions of the plate body 111 in the Y axis direction. The pair of fixing portions 113 are disposed on both sides of the cylindrical body 112 in the Y axis direction. Each of the pair of fixing portions 113 penetrates through the plate body 111. The pair of fixing portions 113 are inserted and fixed to the holes 34b of the pair of support bodies 34, respectively. The plate body 111 is fixed to the support body 34 by the fixing portion 113, and thus, the support portion 11 is attached to the reflection surface 30c and the frame body 32. That is, the support portion 11 is formed separately from the prism 30 and the frame body 32.

The contact portion 12 includes a main body portion 121 and a protruding portion 122. The main body portion 121 is in a tube shape including a bottom portion. The main body portion 121 extends along the Z axis direction. The protruding portion 122 protrudes from the bottom portion of the main body portion 121. The protruding portion 122 is in a column shape. The biasing portion 13 is in a column shape. Axis lines of each of the through hole 33a of the sheet 33, the through hole 32d of the frame body 32, the cylindrical body 112 of the support portion 11, the main body portion 121 of the contact portion 12, the protruding portion 122 of the contact portion 12, and the biasing portion 13 are approximately coincident with each other.

Figure 4:
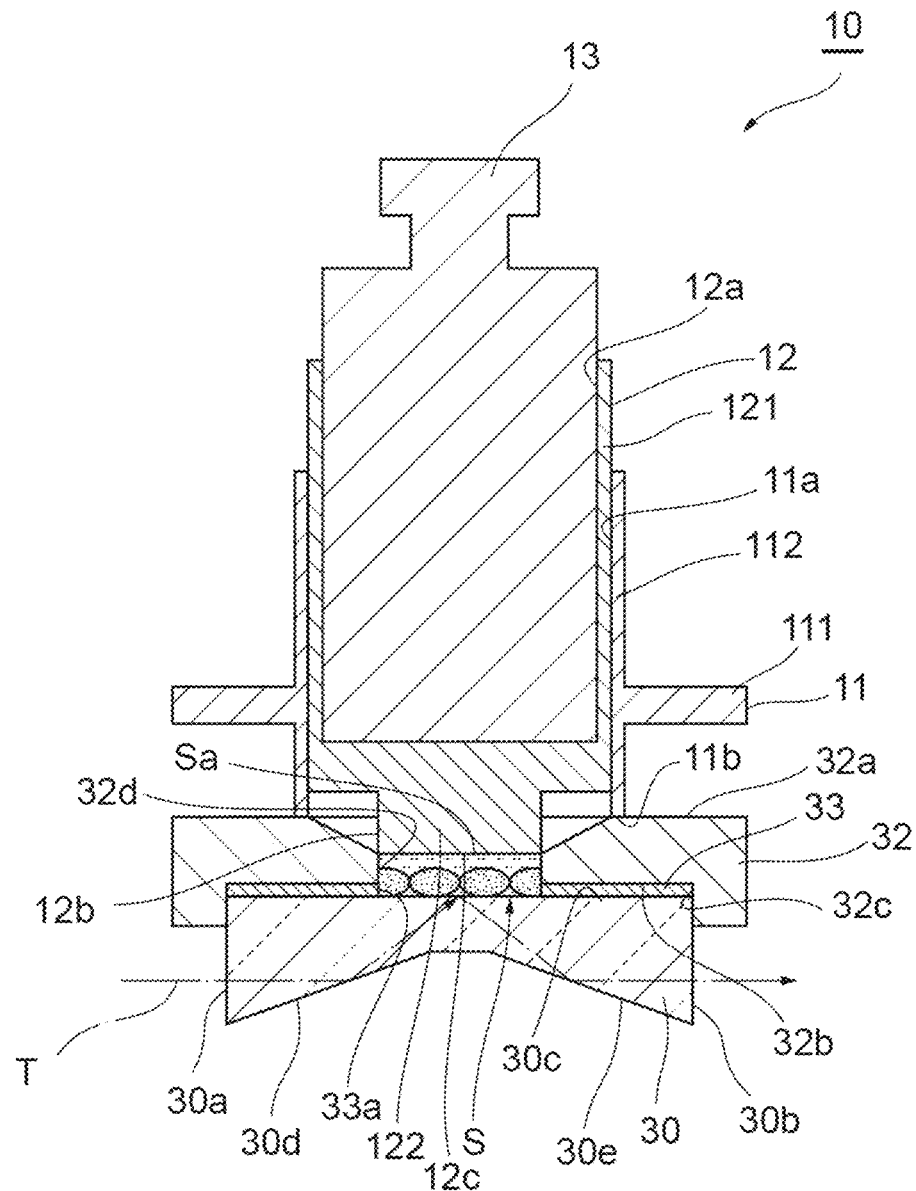
FIG. 4 is a sectional view along line IV-IV illustrated in FIG. 2.

In the ATR device 1, the terahertz wave T is incident on the reflection surface 30c from a side opposite to the measurement target S, and the terahertz wave T reflected on the reflection surface 30c is detected, in a state where the measurement target S is disposed in the through hole 32d of the frame body 32 disposed on the reflection surface 30c. Specifically, as illustrated in FIG. 4, a concave portion 32c is formed on the rear surface 32b of the frame body 32 on a side opposite to the surface 32a.

The frame body 32 is disposed on the reflection surface 30c such that the reflection surface 30c of the prism 30 faces the rear surface 32b, and the prism 30 and the sheet 33 are included in the concave portion 32c when viewed from the Z axis direction. That is, a part of the prism 30 including the reflection surface 30c and the sheet 33 are disposed in the concave portion 32c. The through hole 32d of the frame body 32 includes a tubular portion opening to the rear surface 32b, and a tapered portion opening to the surface 32a that is connected to the tubular portion. The tapered portion is in a cone shape that widens as being separated from the reflection surface 30c. The diameter of the tubular portion of the through hole 32d is approximately the same as the diameter of the through hole 33a of the sheet 33.

The measurement target S is disposed on the reflection surface 30c inside the frame body 32 (inside the tubular portion of the through hole 32d and the through hole 33a). Accordingly, the width of the measurement target S is regulated along a direction parallel to the reflection surface 30c. In addition, a surface Sa of the measurement target S on a side opposite to the reflection surface 30c is movable along a direction perpendicular to the reflection surface 30c (the Z axis direction). For example, in a case where the volume of the measurement target S increases, the surface Sa is moved to be separated from the reflection surface 30c, and in a case where the volume of the measurement target S decreases, the surface Sa is moved to be close to the reflection surface 30c. Note that, the surface Sa and the reflection surface 30c are parallel to each other.

An inner diameter of the cylindrical body 112 of the support portion 11 is greater than the diameter of the through hole 32d on the surface 32a side (a large diameter of the tapered portion). The support portion 11 is fixed to the reflection surface 30c in a state where an end surface 11b of the cylindrical body 112 is in contact with the surface 32a of the frame body 32. The contact portion 12 is supported by the support portion 11 to be movable along the Z axis direction. Specifically, the main body portion 121 of the contact portion 12 is disposed inside the cylindrical body 112. An outer diameter of the main body portion 121 is approximately the same as the inner diameter of the cylindrical body 112. The main body portion 121 is inserted to the cylindrical body 112 to be slidable with respect to an inner surface 11a of the cylindrical body 112. The movement of the main body portion 121 in a direction perpendicular to the Z axis direction is regulated by the cylindrical body 112, and the movement of the main body portion 121 in the Z axis direction is guided by the cylindrical body 112.

The protruding portion 122 of the contact portion 12 is in contact with the surface Sa of the measurement target S in the through hole 32d. Specifically, an outer diameter of the protruding portion 122 is approximately the same as an inner diameter of the tubular portion of the through hole 32d. In a case where the main body portion 121 is guided by the cylindrical body 112 and is moved toward the reflection surface 30c, the protruding portion 122 enters the through hole 32d in a state where a side surface 12b of the protruding portion 122 is in contact with the inner surface of the tubular portion of the through hole 32d. Then, a tip end surface 12c of the protruding portion 122 is in contact with the surface Sa of the measurement target S.

The biasing portion 13 applies a load to the surface Sa of the measurement target S in the through hole 32d via the contact portion 12. Specifically, the biasing portion 13 is disposed in an internal space formed in the main body portion 121. An outer diameter of the biasing portion 13 is approximately the same as an inner diameter of the main body portion 121. The biasing portion 13 is inserted to the main body portion 121. The biasing portion 13, for example, is a weight having a constant weight. The biasing portion 13 biases the contact portion 12 against the reflection surface 30c side along the Z axis direction. The biasing portion 13 applies a load corresponding to the weight of the biasing portion 13 to the contact portion 12 along the Z axis direction. The load is transferred to the surface Sa of the measurement target S via the protruding portion 122.

The pressure application device 10 is configured to be capable of adjusting the magnitude of a pressure that is applied to the measurement target S during a measurement period. In the pressure application device 10, for example, the weight of the biasing portion 13 can be changed. In the pressure application device 10, for example, the biasing portion 13 can be changed to a weight having a different weight. In this embodiment, the pressure application device 10 applies a substantially constant pressure to the measurement target S during the measurement period. Specifically, as described above, the width of the measurement target S along the direction parallel to the reflection surface 30c is regulated by the frame body 32. For this reason, in a case where a load of the biasing portion 13 is transferred to the measurement target S via the contact portion 12, the measurement target S is pressed inside the frame body 32. Accordingly, a pressure is applied to the measurement target S. Here, the biasing portion 13 is the weight having a constant weight, and thus, a constant load is transferred to the measurement target S. Therefore, a constant pressure is applied to the measurement target S. Note that, "applying the substantially constant pressure" indicates applying a pressure within a range of ±5% with respect to a reference value.

The same applies even in a case where the volume of the measurement target S is changed during the measurement period. That is, in a case where the volume of the measurement target S is changed during the measurement period, the contact portion 12 is moved along the Z axis direction in accordance with a change in the volume of the measurement target S, in a state where the tip end surface 12c is in contact with the surface Sa of the measurement target S. That is, the contact portion 12 is moved following the surface Sa. The weight of the biasing portion 13 is constant even in during a period when the volume of the measurement target S is changed, and thus, the pressure that is applied to the measurement target S is also constant.

[Function and Effect of ATR Device and Pressure Application Device]

In the ATR device 1, the pressure application device 10 is configured to be capable of adjusting the magnitude of the pressure that is applied to the measurement target S disposed on the reflection surface 30c. Accordingly, for example, the magnitude of the pressure is adjusted such that the pressure that is applied to the measurement target S disposed on the reflection surface 30c is substantially constant, and thus, a state in which the substantially constant pressure is applied to the measurement target S can be maintained during the measurement period, and in such a state, the terahertz wave T can be incident on the reflection surface 30c from a side opposite to the measurement target S, and the terahertz wave T reflected on the reflection surface 30c can be detected. Accordingly, a change in the pressure generated in the measurement target S due to a change in the volume of the measurement target S during the measurement period is prevented. For this reason, even in a case where the volume of the measurement target S is changed during the measurement period, a pressure condition is maintained in a predetermined condition during the measurement period. Accordingly, according to the ATR device 1, even in the case of the measurement target of which the volume is changed during the measurement period, the information relevant to the measurement target S can be acquired with excellent reproducibility.

In the case of measuring a temporal change in the measurement target S while applying a pressure to the measurement target S, for example, by using a torque wrench as the pressure application device, there is a concern that the information relevant to the measurement target S is not capable of being acquired with excellent reproducibility. Therefore, the present inventors have found that the cause is a change in the volume of the measurement target S during the measurement period. That is, in the case of applying a pressure to the measurement target S by using the torque wrench, the position of a portion of the torque wrench that is in contact with the measurement target S is fixed to the reflection surface 30c. In such a case, when the volume of the measurement target S is changed, the pressure that is applied to the measurement target S is also changed. Accordingly, a measurement condition is changed during the measurement period, and as a result thereof, the information relevant to the measurement target S is not capable of being acquired with excellent reproducibility. This is a problem caused when a temporal change in the measurement target S is measured. In contrast, according to the ATR device 1, as described above, the state in which the substantially constant pressure is applied to the measurement target S can be maintained during the measurement period, and thus, the information relevant to the measurement target S can be acquired with excellent reproducibility. In the case of measuring a temporal change in a measurement target that is accompanied by a hydration transition reaction or the like, such as the measurement target S, a progress ratio, a reaction rate, or the like of the hydration transition reaction may be changed when the pressure that is applied to the measurement target S is changed. For this reason, it is particularly important to apply the substantially constant pressure to the measurement target S that is accompanied by the hydration transition reaction during the measurement period.

In addition, in the ATR device 1, the pressure application device 10 applies the substantially constant pressure to the measurement target S disposed on the reflection surface 30c during the measurement period. Accordingly, as described above, even in the case of the measurement target S of which the volume is changed during the measurement period, the information relevant to the measurement target S can be acquired with excellent reproducibility.

In addition, the ATR device 1 includes the frame body 32 disposed on the reflection surface 30c, inside which the measurement target S is disposed. The pressure application device 10 includes the weight applying a load to the surface Sa of the measurement target S inside the frame body 32. Accordingly, a desired pressure can be applied to the measurement target S disposed on the reflection surface 30c by a simple configuration.

In addition, the ATR device 1 includes the processing unit 80 electrically connected to the detection unit 70. The processing unit 80 acquires the information relevant to the measurement target S on the basis of the plurality of electrical field waveforms respectively corresponding to the plurality of times separated from each other that are acquired by the detection unit 70. Accordingly, the information relevant to the measurement target S can be easily acquired with excellent reproducibility.

In addition, in the ATR device 1, the pressure is applied to the measurement target S disposed on the reflection surface 30c, and thus, the measurement target S can be homogeneously tight on the reflection surface 30c. Accordingly, the information relevant to the measurement target S can be efficiently acquired.

In addition, the through hole 32d of the frame body 32 is in a circle shape when viewed from the Z axis direction. Accordingly, for example, the pressure that is applied to the measurement target S can be homogeneous, compared to a case where the through hole 32d is in a polygon shape when viewed from the Z axis direction.

In addition, the through hole 32d includes the tapered portion that widens as being separated from the reflection surface 30c. Accordingly, the measurement target S can be easily disposed inside the frame body 32 from the surface 32a side of the frame body 32.

In addition, the pressure application device 10 is used in the ATR device 1, and thus, for example, the state in which the substantially constant pressure is applied to the measurement target S can be maintained during the measurement period, and in such a state, the terahertz wave T can be incident on the reflection surface 30c from a side opposite to the measurement target S, and the terahertz wave T reflected on the reflection surface 30c can be detected. Accordingly, a change in the pressure generated in the measurement target S due to a change in the volume of the measurement target S during the measurement period is prevented. For this reason, even in a case where the volume of the measurement target S is changed during the measurement period, the pressure condition is maintained in a predetermined condition during the measurement period. Accordingly, according to the pressure application device 10, even in the case of the measurement target S of which the volume is changed during the measurement period, the information relevant to the measurement target S can be acquired with excellent reproducibility.

In addition, in the pressure application device 10, the biasing portion 13 may be the weight. Accordingly, the substantially constant pressure can be applied to the measurement target S disposed on the reflection surface 30c by a simple configuration. In addition, the weight is replaced, and thus, the weight of the biasing portion 13 can be easily changed, and the magnitude of the pressure that is applied to the measurement target S can be easily adjusted.

In addition, in the pressure application device 10, a direction perpendicular to the surface Sa of the measurement target S (the Z axis direction) is the vertical direction. In the contact portion 12, the space in which the biasing portion 13 is disposed is formed. Accordingly, the biasing portion 13 can be stably supported by the contact portion 12. For this reason, the pressure can be stably applied to the measurement target S disposed on the reflection surface 30c.

In addition, in the pressure application device 10, the support portion 11 includes the cylindrical body 112 extending along the Z axis direction. The contact portion 12 is disposed inside the cylindrical body 112. Accordingly, the pressure can be stably applied to the measurement target S disposed on the reflection surface 30c by a simple configuration. That is, even in a case where the volume of the measurement target S is changed during the measurement period, an axial deviation of the contact portion 12, and the like can be suppressed, and thus, the contact portion 12 can be stably supported, and a homogeneous pressure can be stably applied to the measurement target S.

In addition, in the pressure application device 10, the support portion 11 is fixed to the reflection surface 30c in a state where the cylindrical body 112 is in contact with the frame body 32. Accordingly, the cylindrical body 112 is brought close to the frame body 32, and thus, the contact portion 12 can be supported in a position close to the frame body 32. For this reason, the pressure can be stably applied to the measurement target S disposed on the reflection surface 30c.

[Terahertz Wave Attenuated Total Reflection Spectroscopic Method]

Figure 5:
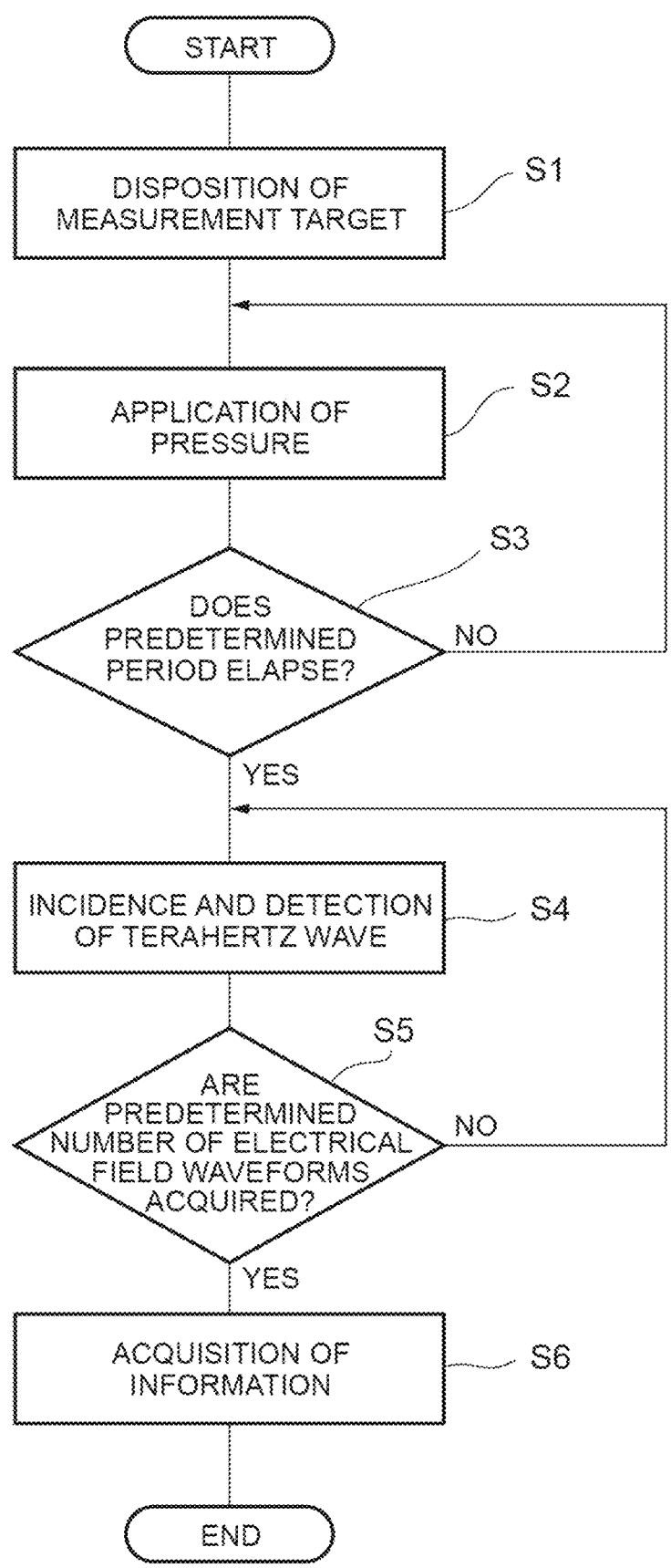
FIG. 5 is a flowchart of a terahertz wave attenuated total reflection spectroscopic method of one embodiment.

Next, a terahertz wave attenuated total reflection spectroscopic method (hereinafter, referred to as an "ATR method") that is implemented in the ATR device 1 will be described. As illustrated in FIG. 5, first, the measurement target S of which the volume is changed during the measurement period is disposed on the reflection surface 30c (step S1). Specifically, in step S1, the measurement target S is disposed in the through hole 32d of the frame body 32 disposed on the reflection surface 30c. Step S1 corresponds to a first step.

Subsequently, a substantially constant pressure is applied to the measurement target S (step S2). Specifically, first, the support portion 11 is fixed to the pair of support bodies 34. Subsequently, the contact portion 12 is disposed inside the cylindrical body 112 of the support portion 11. Subsequently, the biasing portion 13 is disposed inside the main body portion 121 of the contact portion 12.

Subsequently, it is determined whether or not a predetermined period elapses (step S3). In the case of NO in step S3, the process returns to step S2. That is, in step S2, the substantially constant pressure is continuously applied to the measurement target S until the predetermined period elapses. The predetermined period, for example, is approximately 0.1 seconds to 3 minutes. Note that, the predetermined period can be optimized on the basis of the type of measurement target S, the magnitude of the pressure that is applied to the measurement target S, or the like. In the case of YES in step S3, the terahertz wave T is incident on the reflection surface 30c from a side opposite to the measurement target S, and the terahertz wave T reflected on the reflection surface 30c is detected, during the measurement period (step S4). Specifically, the terahertz wave T is incident on the incidence surface 30a of the prism 30 by the output unit 20, the correlation between the terahertz wave T and the probe light P2 output from the multiplexing unit 60 is detected by the detection unit 70, and the electrical field amplitude of the terahertz wave T is detected.

In step S4, the terahertz wave T is continuously incident on the reflection surface 30c, and the terahertz wave T reflected on the reflection surface 30c is continuously detected, during the measurement period. In step S4, the data including the plurality of electrical field waveforms of the terahertz waves T respectively corresponding to the plurality of times separated from each other during the measurement period is acquired. Specifically, in step S4, the incident timing of the probe light P2 with respect to the terahertz wave detection element 71 is swept by the optical path length difference adjustment unit 40 a plurality of times, and thus, the plurality of electrical field waveforms of the terahertz waves T is acquired, during the measurement period.

The plurality of electrical field waveforms of the terahertz waves T acquired in step S4 are temporally separated from each other, and thus, a temporal change in the measurement target S can be measured. In step S4, the state in which the substantially constant pressure is applied to the measurement target S disposed on the reflection surface 30c is maintained during the measurement period.

Subsequently, it is determined whether or not a predetermined number of electrical field waveforms of the terahertz waves T are acquired (step S5). In the case of NO in step S5, the process returns to step S4. That is, the electrical field waveform of the terahertz wave T is continuously acquired until the predetermined number of electrical field waveforms of the terahertz waves T are acquired during the measurement period. In the case of YES in step S5, the information relevant to the measurement target S is acquired on the basis of the plurality of electrical field waveforms of the terahertz waves T acquired in step S4 (step S6). Specifically, in step S6, the plurality of spectra respectively corresponding to the plurality of electrical field waveforms of the terahertz waves T detected by the detection unit 70 are obtained. Subsequently, the information relevant to the measurement target S is acquired on the basis of the plurality of spectra. Accordingly, a temporal change in the measurement target S is measured. Step S2 to step S5 correspond to a second step. Step S6 corresponds to a third step.

As described above, in the second step, the terahertz wave T is incident on the reflection surface 30c, and the terahertz wave T reflected on the reflection surface 30c is detected, after the predetermined period elapses from the start of the application of the substantially constant pressure with respect to the measurement target S disposed on the reflection surface 30c. That is, the second step includes the predetermined period and the measurement period after the predetermined period elapses. In the second step, the state in which the substantially constant pressure is applied to the measurement target S disposed on the reflection surface 30c is maintained during the predetermined period and the measurement period. In the second step, the terahertz wave T is incident on the reflection surface 30c, and the terahertz wave T reflected on the reflection surface 30c is detected, during the measurement period.

[Function and Effect of ATR Method]

In the ATR method, the state in which the substantially constant pressure is applied to the measurement target S disposed on the reflection surface 30c is maintained during the measurement period, and in such state, the terahertz wave T is incident on the reflection surface 30c from a side opposite to the measurement target S, and the terahertz wave T reflected on the reflection surface 30c is detected. Accordingly, change in the pressure that is generated in the measurement target S due to a change in the volume of the measurement target S during the measurement period is prevented. For this reason, even in a case where the volume of the measurement target S is changed during the measurement period, the pressure condition is maintained in the predetermined condition during the measurement period. Accordingly, according to the ATR method, even in the case of the measurement target S of which the volume is changed during the measurement period, the information relevant to the measurement target S can be acquired with excellent reproducibility.

In addition, the ATR method includes step S6 of acquiring the information relevant to the measurement target S on the basis of the plurality of electrical field waveforms of the terahertz waves T acquired in step S4. Accordingly, the information relevant to the measurement target S can be easily acquired with excellent reproducibility.

In addition, in the second step of the ATR method, the terahertz wave T is incident on the reflection surface 30c, and the terahertz wave T reflected on the reflection surface 30c is detected, after the predetermined period elapses from the start of the application of the substantially constant pressure with respect to the measurement target S disposed on the reflection surface 30c. Accordingly, the information relevant to the measurement target S can be acquired with more excellent reproducibility.

In addition, in the measurement target S of the ATR method, the anhydrate is transitioned to a hydrate during the measurement period. Accordingly, information relevant to hydration transition of the anhydrate can be acquired with excellent reproducibility.

In addition, in the ATR method, the anhydrate is a powder. Accordingly, information relevant to hydration transition of the powder can be acquired with excellent reproducibility.

In addition, in the ATR method, the volume of the measurement target S decreases during the measurement period. Accordingly, even in the case of the measurement target of which the volume decreases during the measurement period, the information relevant to the measurement target S can be acquired with excellent reproducibility.

FIGS. 6A and 6B and FIGS. 7A and 7B are diagrams showing measurement results of an ATR method of a comparative example. In the comparative example, the information relevant to the measurement target S was acquired in a state where a pressure was applied to the measurement target S by using a torque wrench instead of the pressure application device 10. In the comparative example, the information relevant to the measurement target S was started to be acquired immediately after a pressure was applied to the measurement target S. In the comparative example, two sets of such ATR methods were implemented.

Figure 6A:
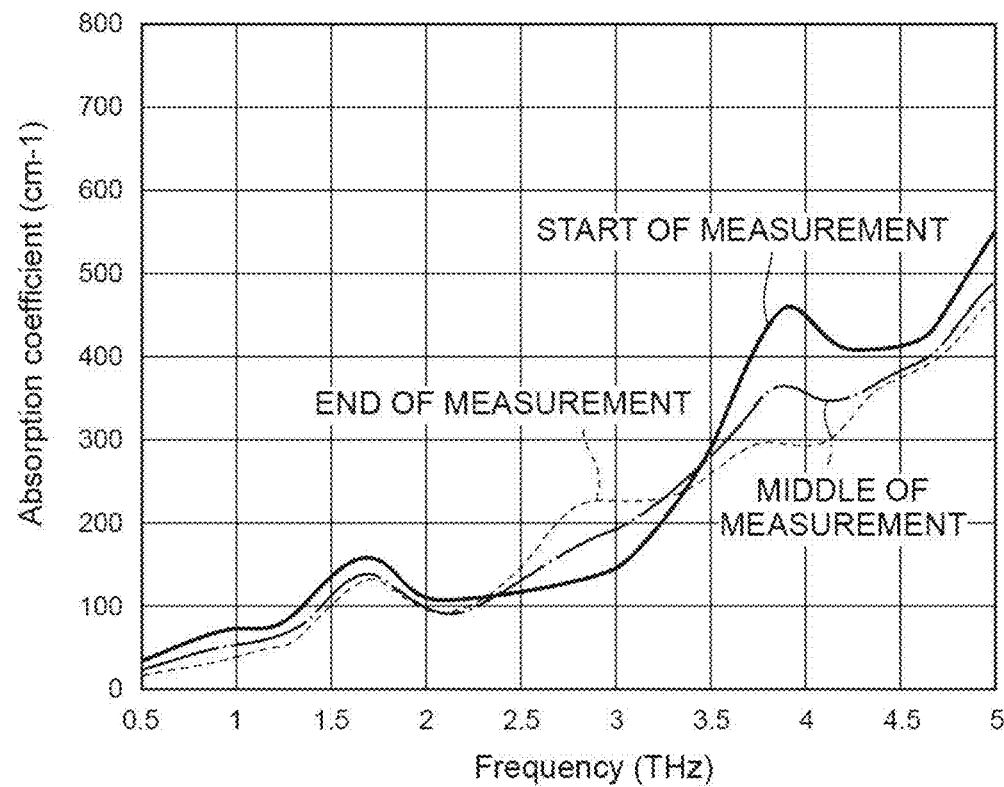
FIGS. 6A and 6B are diagrams showing measurement results of a terahertz wave attenuated total reflection spectroscopic method of a comparative example.
Figure 6B:
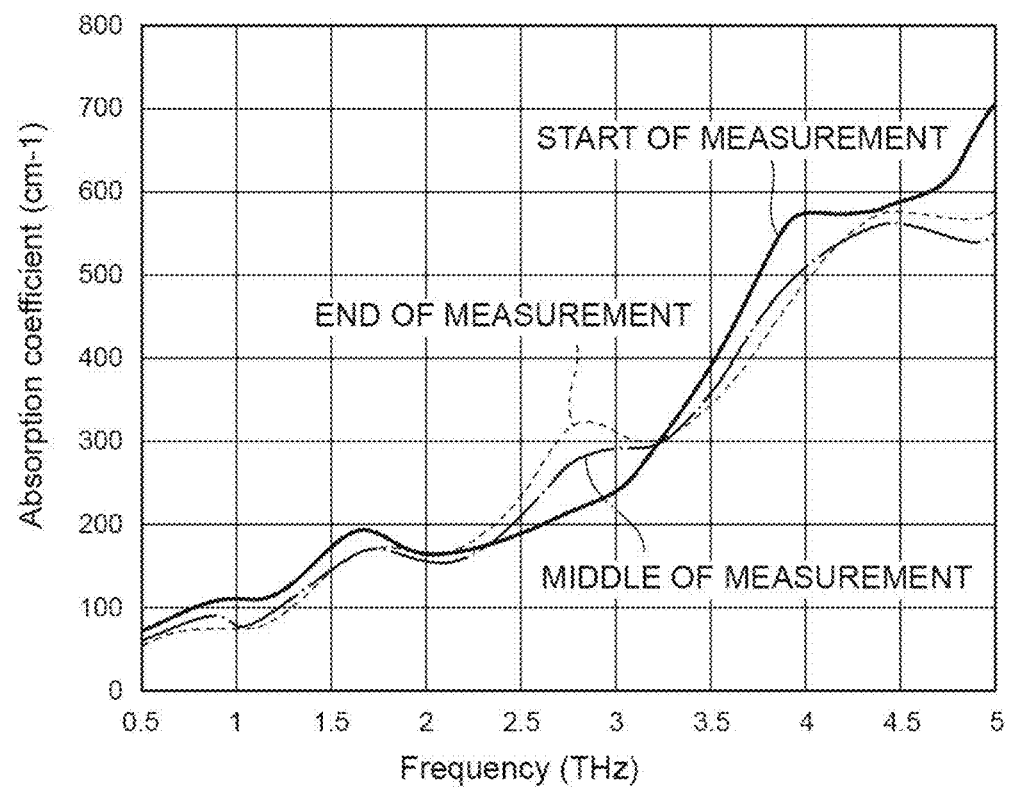

FIG. 6A is a diagram showing an absorption spectrum obtained in the first set of the comparative example, and FIG. 6B is a diagram showing an absorption spectrum obtained in the second set of the comparative example. In FIG. 6A and FIG. 6B, a solid line represents a result at the start of the measurement in the measurement period (a first result), a dotted line represents a result at the end of the measurement in the measurement period (a final result), a dashed-dotted line represents a result in the middle of the measurement in the measurement period (a result between the first result and the final result). As shown in FIG. 6A and FIG. 6B, in the comparative example, the first result (a baseline) of the first set is not coincident with the first result (a baseline) of the second set. That is, in the comparative example, the information relevant to the measurement target S was not capable of being acquired with excellent reproducibility.

Figure 7A:
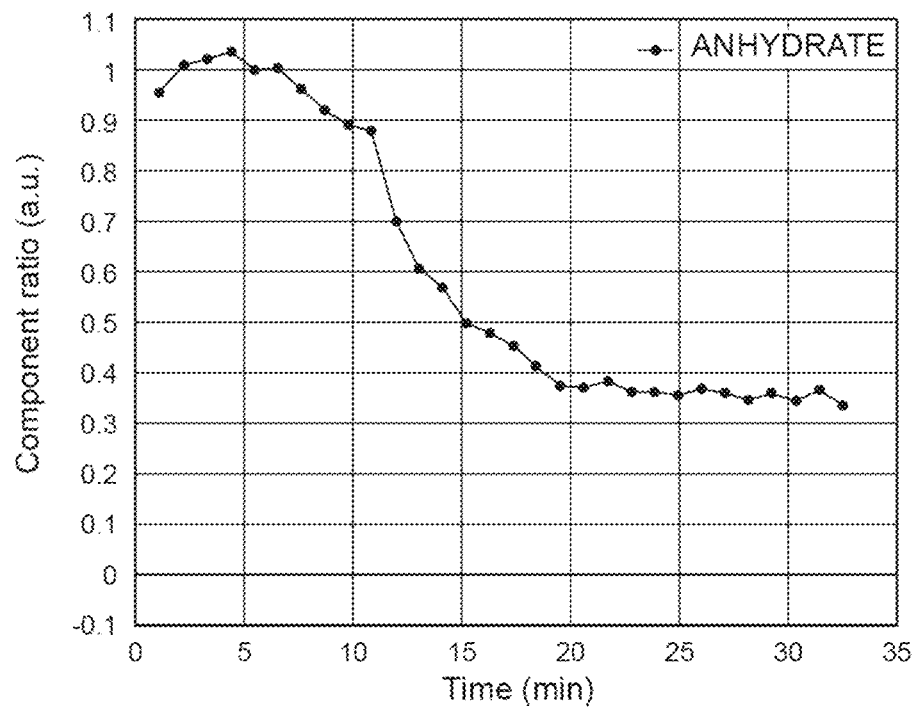
FIGS. 7A and 7B are diagrams showing the measurement results of the terahertz wave attenuated total reflection spectroscopic method of the comparative example.
Figure 7B:
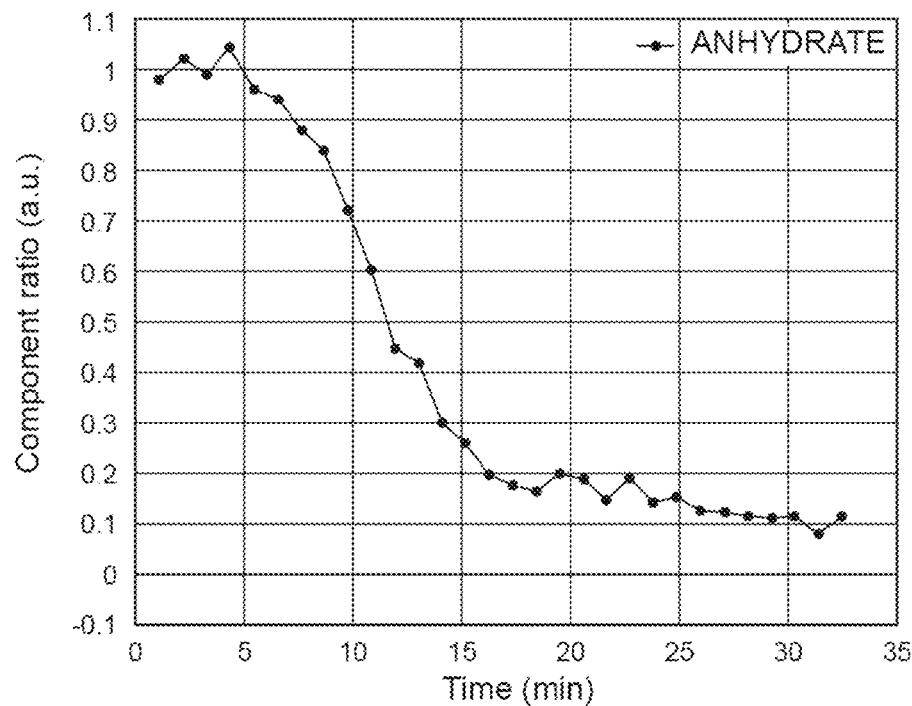

FIG. 7A is a diagram showing a temporal change in the ratio of the anhydrate in the measurement target S in the first set of the comparative example. FIG. 7B is a diagram showing a temporal change in the ratio of the anhydrate in the measurement target S in the second set of the comparative example. As shown in FIG. 7A and FIG. 7B, in any set of the comparative example, the anhydrate remained in the measurement target S even after a measurement time of approximately 30 minutes elapsed. That is, in the comparative example, a complete hydration transition reaction of the measurement target S did not occur. In addition, in each of the first set and the second set of the comparative example, the ratio of the anhydrate varied.

FIGS. 8A and 8B and FIGS. 9A and 9B are diagrams showing measurement results of an ATR method of a first example. In the first example, the information relevant to the measurement target S was acquired while maintaining a state in which a substantially constant pressure was applied to the measurement target S by using the pressure application device 10 during the measurement period. In the first example, the information relevant to the measurement target S was started to be acquired after the predetermined period elapsed from the start of the application of the substantially constant pressure with respect to the measurement target S. In the first example, two sets of such ATR methods were implemented.

Figure 8A:
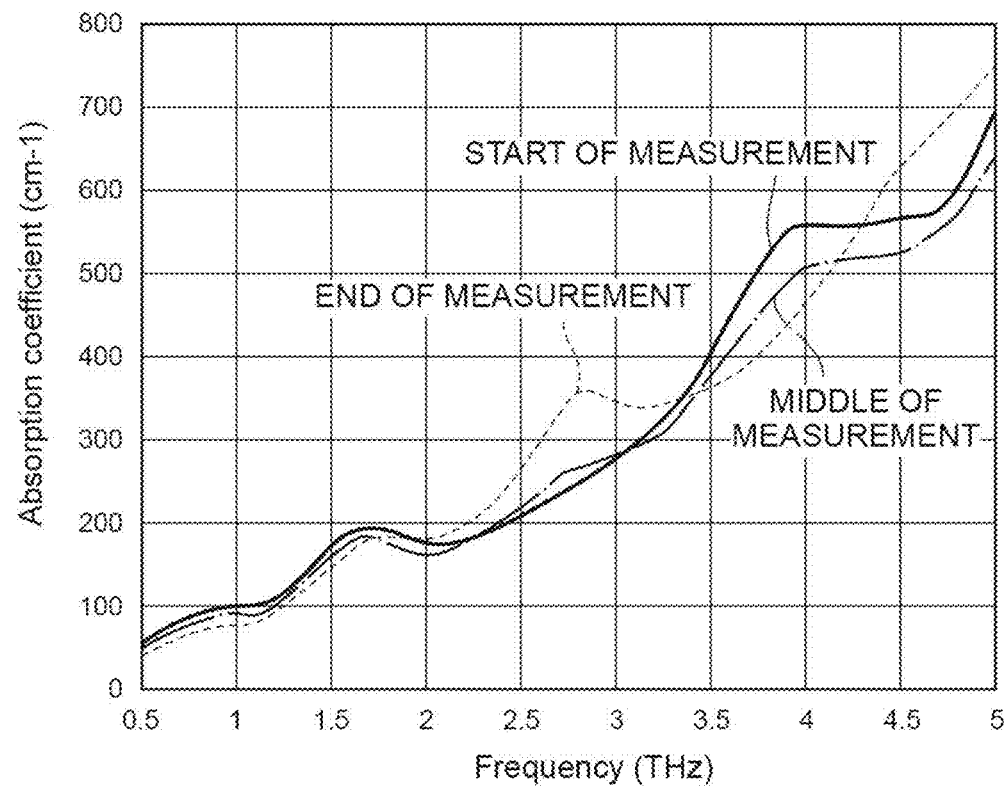
FIGS. 8A and 8B are diagrams showing measurement results of a terahertz wave attenuated total reflection spectroscopic method of a first example.
Figure 8B:
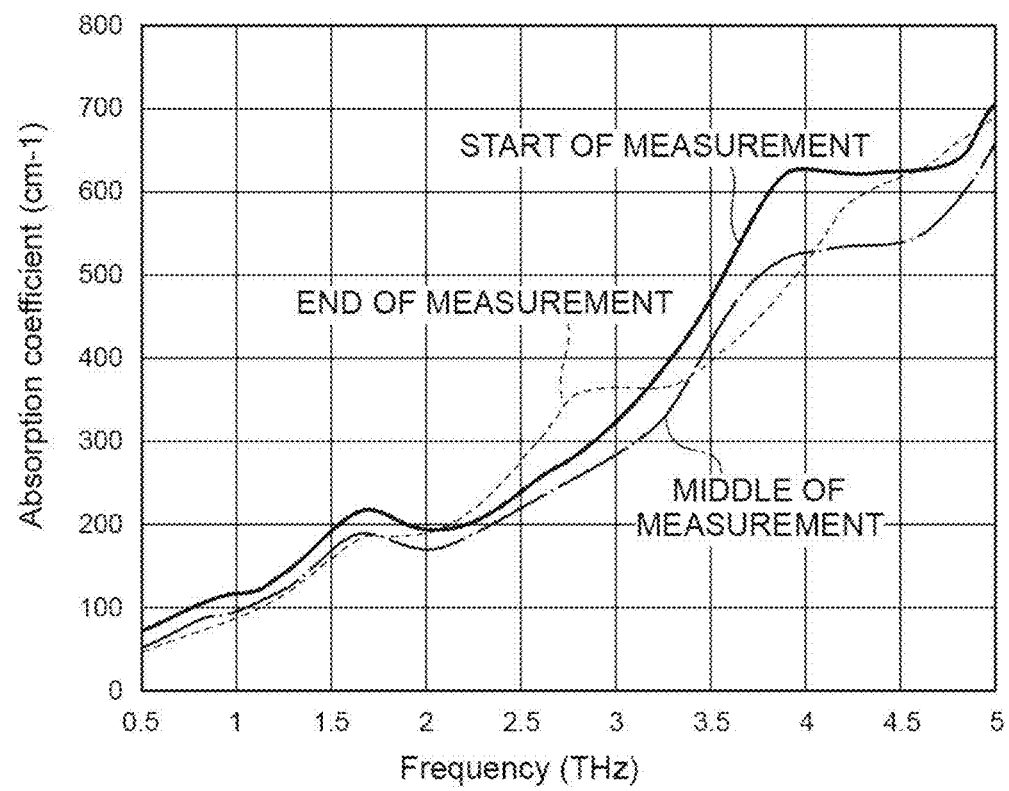

FIG. 8A is a diagram showing an absorption spectrum obtained in the first set of the first example, and FIG. 8B is a diagram showing an absorption spectrum obtained in the second set of the first example. In FIG. 8A and FIG. 8B, a solid line represents a result at the start of the measurement in the measurement period (a first result), a dotted line represents a result at the end of the measurement in the measurement period (a final result), and a dashed-dotted line represents a result in the middle of the measurement in the measurement period (a result between the first result and the final result). As shown in FIG. 8A and FIG. 8B, in the first example, the first result (a baseline) of the first set is coincident with the first result (a baseline) of the second set, compared to the comparative example. That is, in the first example, the information relevant to the measurement target S was capable of being acquired with excellent reproducibility.

Figure 9A:
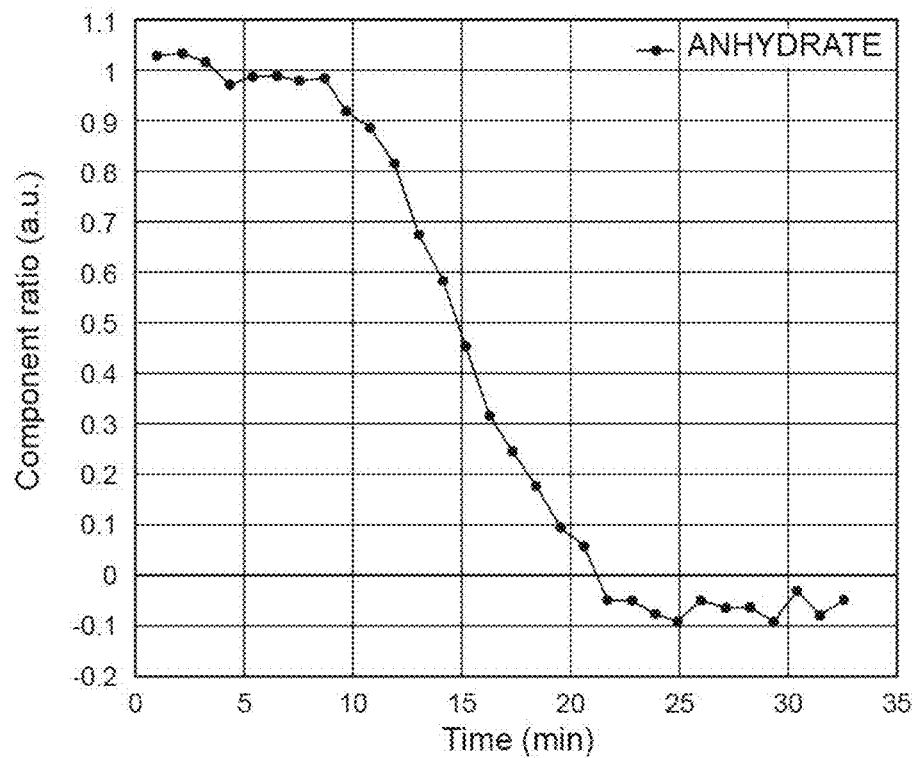
FIGS. 9A and 9B are diagrams showing the measurement results of the terahertz wave attenuated total reflection spectroscopic method of the first example.
Figure 9B:
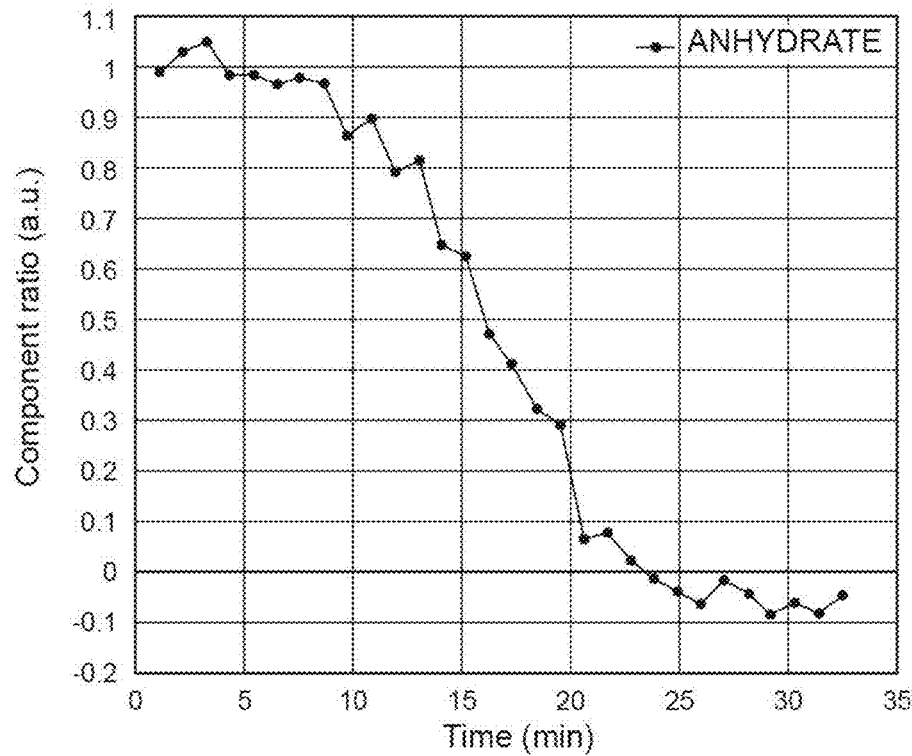

FIG. 9A is a diagram showing a temporal change in the ratio of the anhydrate in the measurement target S in the first set of the first example. FIG. 9B is a diagram showing a temporal change in the ratio of the anhydrate in the measurement target S in the second set of the first example. As shown in FIG. 9A and FIG. 9B, in any set of the first example, the anhydrate disappeared in the measurement target S. That is, in the first example, a complete hydration transition reaction of the measurement target S occurred.

FIGS. 10A and 10B and FIGS. 11A and 11B are diagrams showing measurement results of an ATR method of a second example. In the second example, as with the first example, the information relevant to the measurement target S was acquired while maintaining the state in which the substantially constant pressure was applied to the measurement target S by using the pressure application device 10 during the measurement period. In the second example, as with the first example, the information relevant to the measurement target S was started to be acquired after the predetermined period elapsed from the start of the application of the substantially constant pressure with respect to the measurement target S. In the second example, two sets of such ATR methods were implemented. In the first set of the second example, a mixture in which 25 mg of theophylline was mixed in 25 µl of water and a dispersant was used as the measurement target S. In the second set of the second example, a mixture in which 25 mg of theophylline was mixed in 100 µl of water and a dispersant was used as the measurement target S.

Figure 10A:
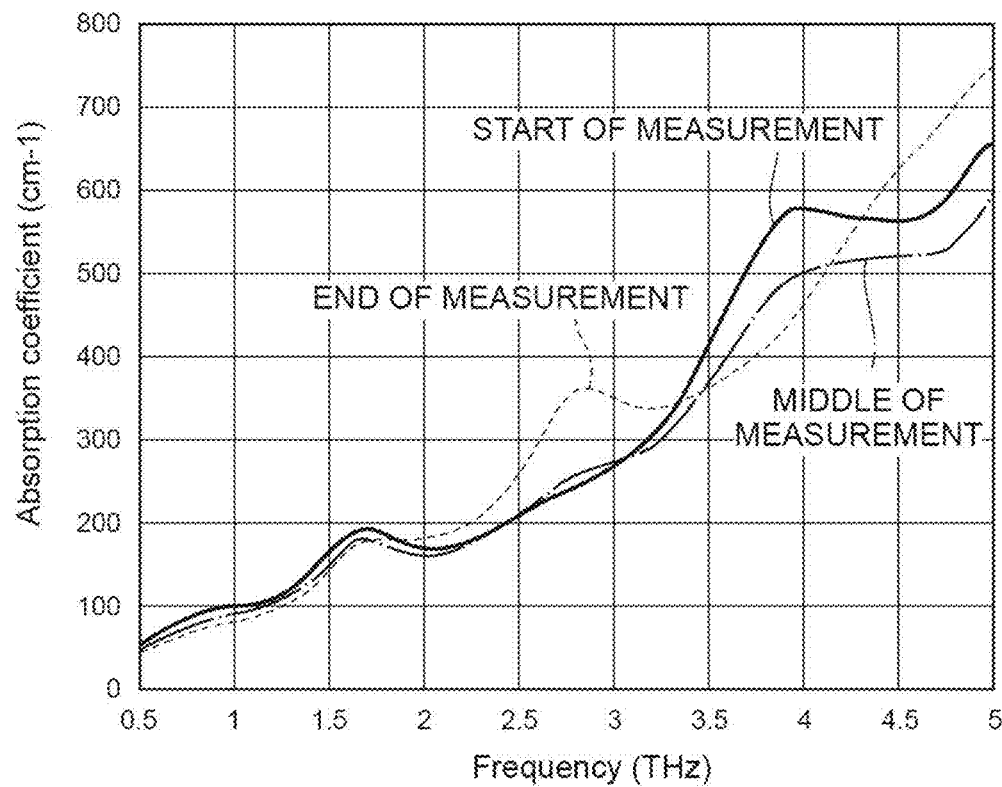
FIGS. 10A and 10B are diagrams showing measurement results of a terahertz wave attenuated total reflection spectroscopic method of a second example.
Figure 10B:
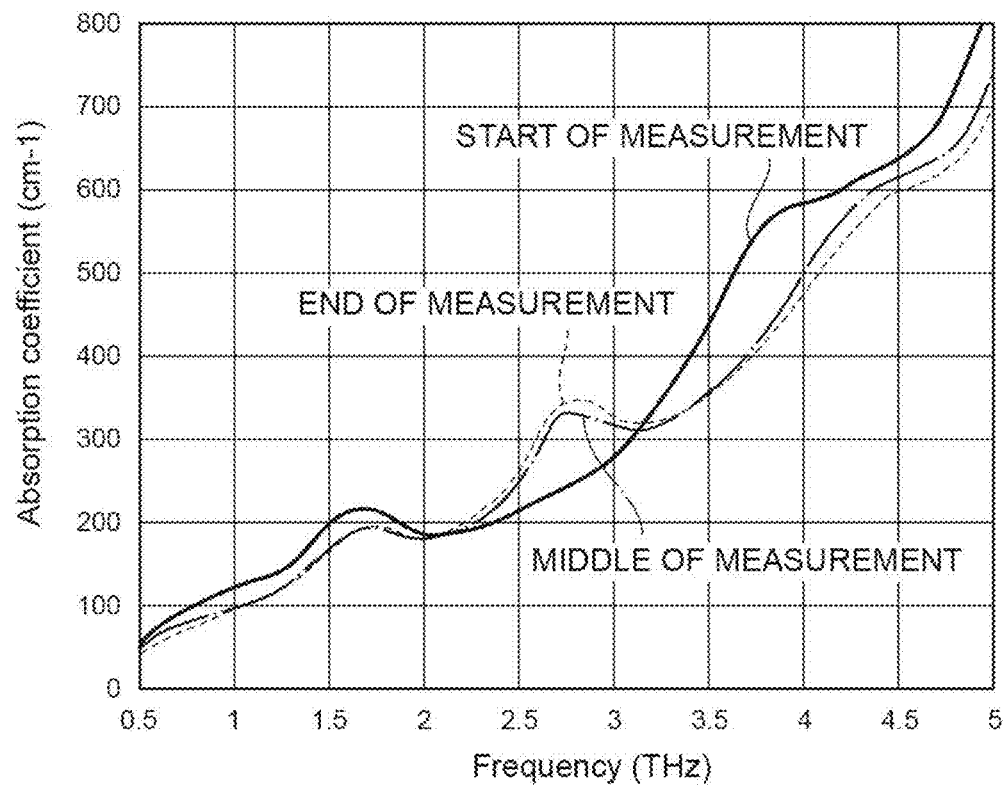

FIG. 10A is a diagram showing an absorption spectrum obtained in the first set of the second example, and FIG. 10B is a diagram showing an absorption spectrum obtained in the second set of the second example. In FIG. 10A and FIG. 10B, a solid line represents a result at the start of the measurement in the measurement period (a first result), a dotted line represents a result at the end of the measurement in the measurement period (a final result), and a dashed-dotted line represents a result in the middle of the measurement in the measurement period (a result between the first result and the final result). As shown in FIG. 10A and FIG. 10B, in the second example, the first result (a baseline) of the first set is coincident with the first result (a baseline) of the second set, compared to the comparative example. That is, in the second example, the information relevant to the measurement target S was capable of being acquired with excellent reproducibility.

Figure 11A:
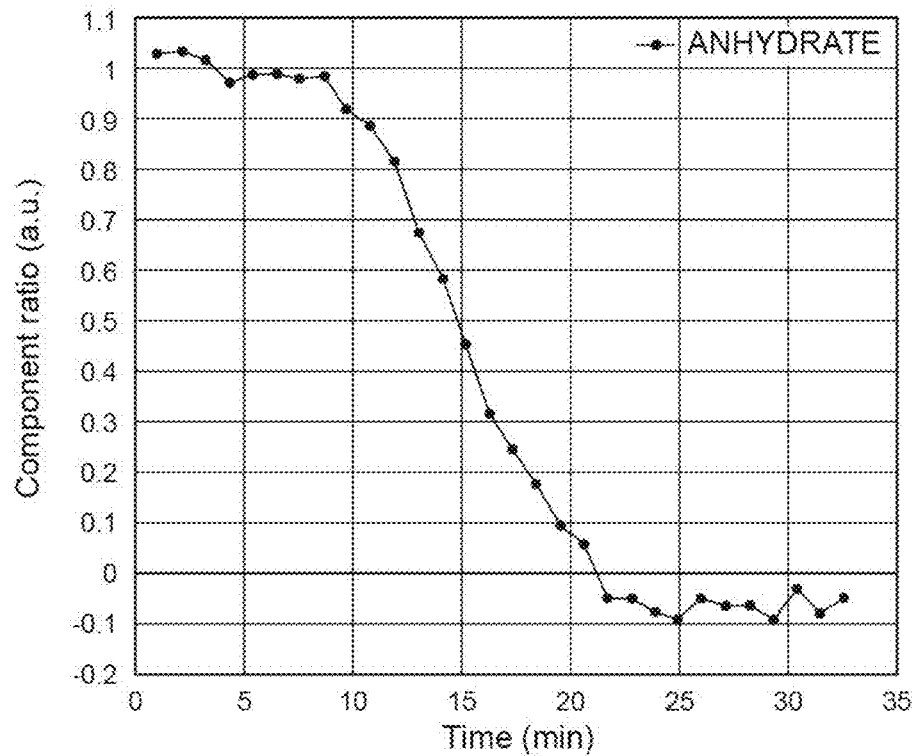
FIGS. 11A and 11B are diagrams showing the measurement results of the terahertz wave attenuated total reflection spectroscopic method of the second example.
Figure 11B:
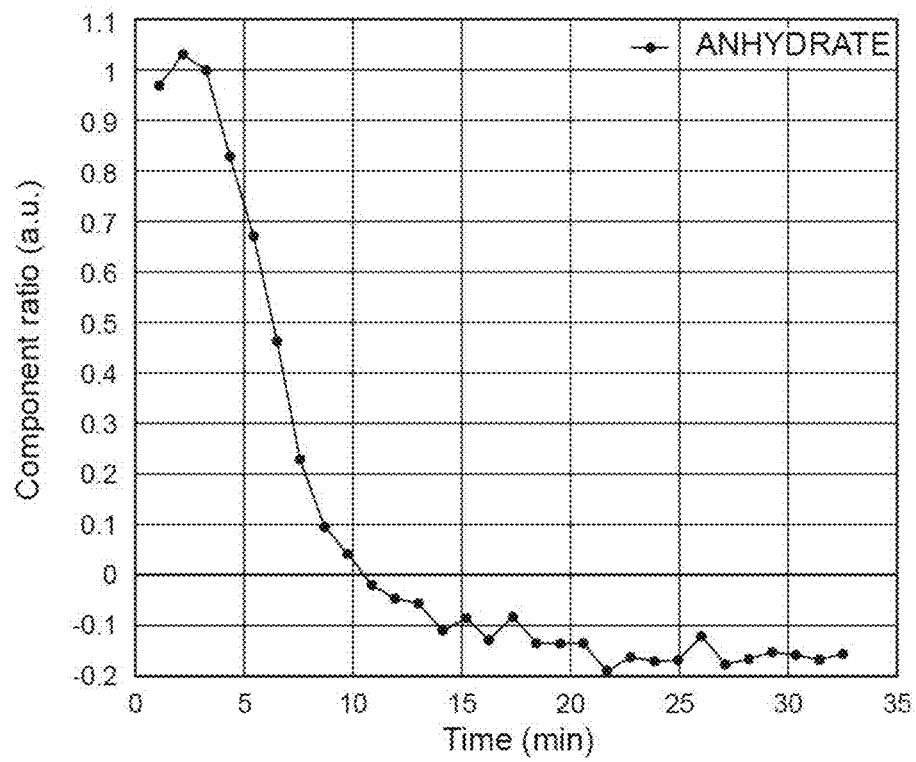

FIG. 11A is a diagram showing a temporal change in the ratio of the anhydrate in the measurement target S in the first set of the second example. FIG. 11B is a diagram showing a temporal change in the ratio of the anhydrate in the measurement target S in the second set of the second example. As shown in FIG. 11A and FIG. 11B, in any set of the second example, the anhydrate disappeared in the measurement target S. That is, in the second example, a complete hydration transition reaction of the measurement target S occurred. As described above, in each of the first set and the second set of the second example, even in a case where the amount of measurement target S (the amount of water and dispersant) was different, the information relevant to the measurement target S was capable of being acquired with excellent reproducibility.

The present inventors have formulated the following hypothesis with respect to the reason that in the first example and the second example, the information relevant to the measurement target S was capable of being acquired with excellent reproducibility, compared to the comparative example.

Figure 12A:
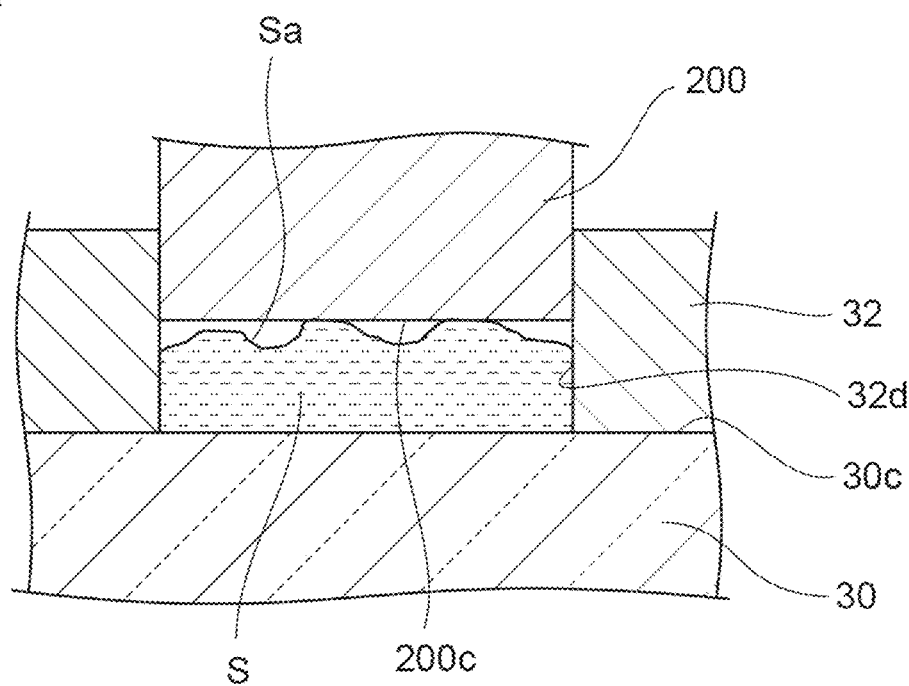
FIGS. 12A and 12B are diagrams for describing a principle in which information relevant to a measurement target can be acquired with excellent reproducibility.

That is, in a case where a pressure is applied to the measurement target S, it is considered that there may be a minute irregularity or a minute inclination on the surface Sa of the measurement target S immediately after the pressure is applied. FIG. 12A is a virtual diagram illustrating the surface Sa of the measurement target S immediately after a pressure is applied to the measurement target S by applying a load to the contact portion 200 with the torque wrench, in the comparative example. As illustrated in FIG. 12A, it is considered that there is an irregularity or an inclination on the surface Sa. Accordingly, it is considered that there is pressurization unevenness (local pressure concentration) according to the irregularity or the inclination of the surface Sa on the interface between a tip end surface 200c of the contact portion 200 and the measurement target S, the pressurization unevenness is transferred to the reflection surface 30c via the measurement target S, and as a result thereof, a pressing degree of the measurement target S with respect to the reflection surface 30c is also changed in accordance with a location. In a case where a plurality of sets of ATR methods are implemented, it is considered that the situation of the minute irregularity or the minute inclination on the surface Sa of the measurement target S differs (varies) for each of the plurality of sets. Therefore, in the comparative example, in a case where the plurality of sets of ATR methods are implemented, it is considered that the first results in each of the sets vary without being coincident with each other.

Figure 12B:
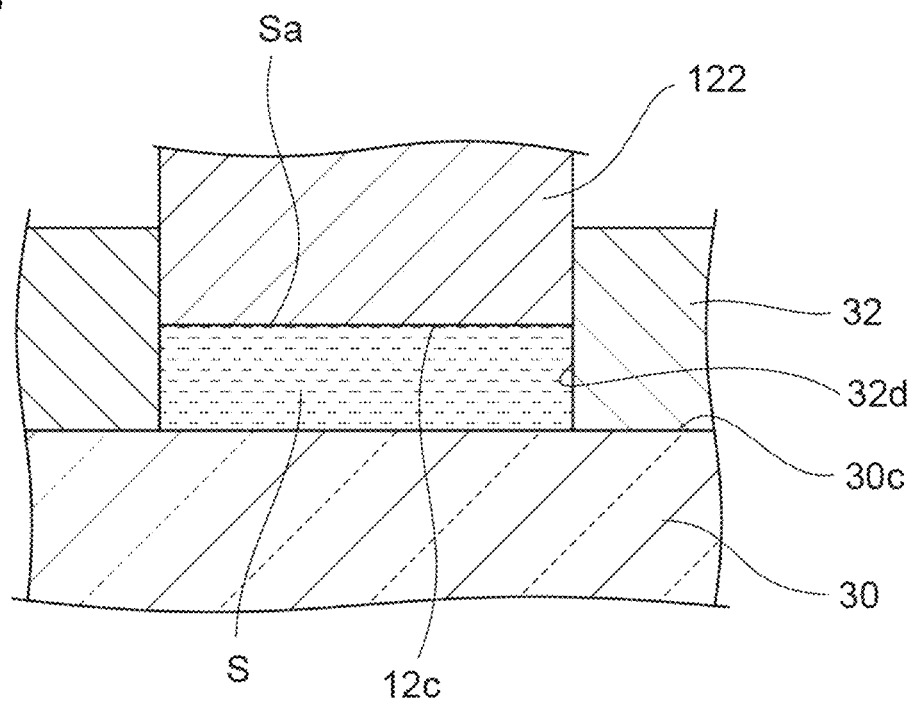

FIG. 12B is a virtual diagram illustrating the surface Sa of the measurement target S immediately after a pressure is applied to the measurement target S by using the pressure application device 10, in the first example and the second example. In the first example and the second example, the information relevant to the measurement target S was started to be acquired after the predetermined period elapsed from the start of the application of the substantially constant pressure with respect to the measurement target S. As illustrated in FIG. 12B, in the first example and the second example, it is considered that the minute irregularity or the minute inclination on the surface Sa of the measurement target S is averaged by the tip end surface 12c of the contact portion 12, and the pressurization unevenness according to a location is less likely to occur on the surface Sa, at the start of the measurement in the measurement period. As a result thereof, it is considered that the pressing degree of the measurement target S with respect to the reflection surface 30c is homogeneous. Therefore, in the first example and the second example, in a case where the plurality of sets of ATR methods are implemented, it is considered that the first results in each of the sets are coincident with each other (have a small difference).

MODIFICATION EXAMPLE

Figure 13:
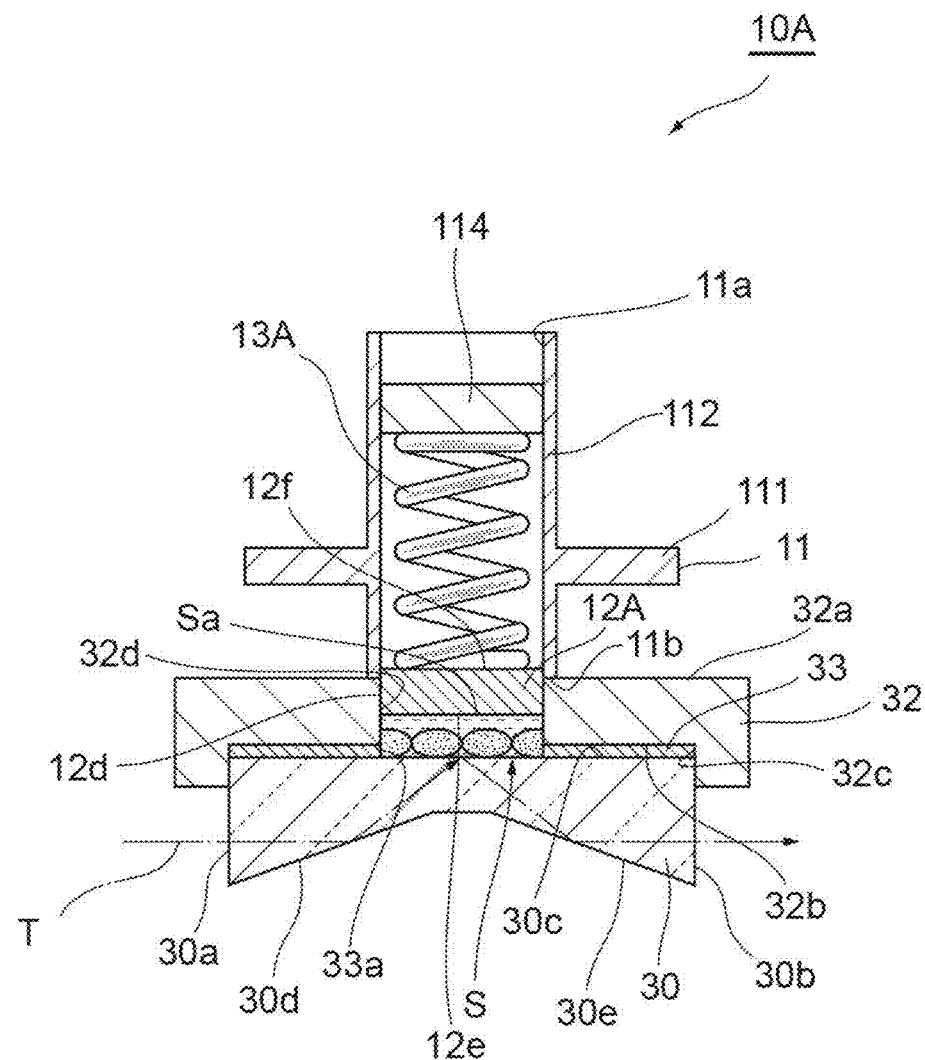
FIG. 13 is a configuration diagram of a pressure application device of a modification example.

The present disclosure is not limited to the embodiment described above. As illustrated in FIG. 13, the ATR device 1 may include a pressure application device 10A instead of the pressure application device 10. The pressure application device 10A is mainly different from the pressure application device 10 in that a contact portion 12A is provided instead of the contact portion 12, a biasing portion 13A is provided instead of the biasing portion 13, and a fixing member 114 is further provided. The other configuration of the pressure application device 10A is the same as that of the pressure application device 10, and thus, the detailed description will be omitted.

The contact portion 12A, for example, is in a disk shape. The contact portion 12A is disposed inside the cylindrical body 112 of the support portion 11. An outer diameter of the contact portion 12A is approximately the same as the inner diameter of the cylindrical body 112. The contact portion 12A is inserted to the cylindrical body 112 to be slidable with respect to the inner surface 11a of the cylindrical body 112. The movement of the contact portion 12A in the direction perpendicular to the Z axis direction is regulated by the cylindrical body 112, and the movement of the contact portion 12A in the Z axis direction is guided by the cylindrical body 112. In the pressure application device 10A, the inner diameter of the cylindrical body 112 is approximately the same as the diameter of the through hole 32d of the frame body 32. The contact portion 12A enters the through hole 32d in a state where the side surface 12d of the contact portion 12A is in contact with the inner surface of the through hole 32d. Then, the tip end surface 12e of the contact portion 12A is in contact with the surface Sa of the measurement target S.

The fixing member 114, for example, is in a disk shape. The fixing member 114 is fixed to the inner surface 11a of the cylindrical body 112. The fixing member 114 blocks an opening of the cylindrical body 112 on a side opposite to the frame body 32. The biasing portion 13A, for example, is an elastic body such as a spring. The biasing portion 13A is contained inside the cylindrical body 112. The biasing portion 13A is disposed between the rear surface 12f of the contact portion 12 on a side opposite to the tip end surface 12e and the fixing member 114 in a compressed state. The biasing portion 13A applies a constant load to the contact portion 12A. The biasing portion 13A applies a constant load to the surface Sa of the measurement target S in the through hole 32d via the contact portion 12A.

Figure 14:
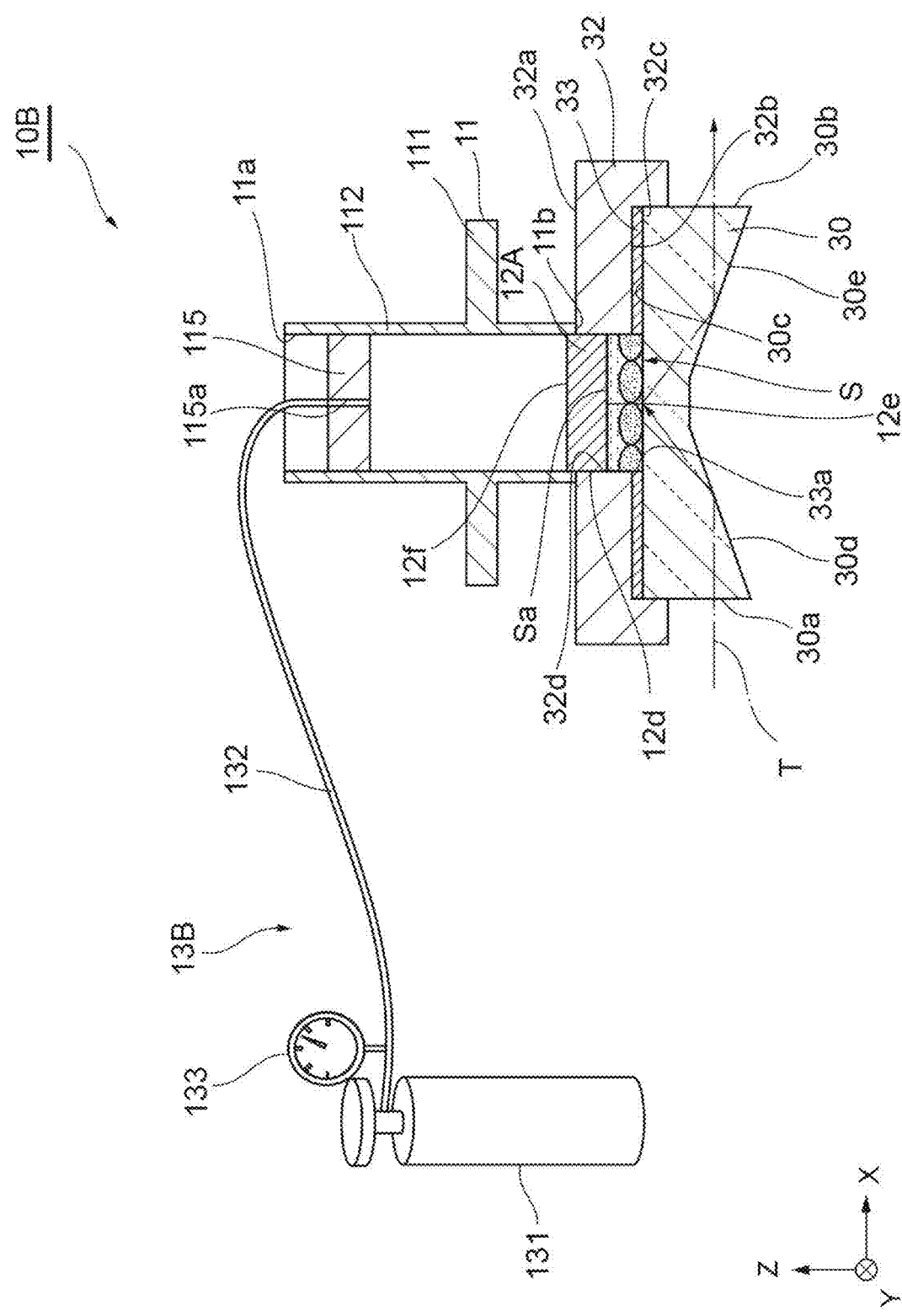
FIG. 14 is a configuration diagram of a pressure application device of a modification example.

In addition, as illustrated in FIG. 14, the ATR device 1 may include a pressure application device 10B instead of the pressure application device 10. The pressure application device 10B is mainly different from the pressure application device 10A in that a biasing portion 13B is provided instead of the biasing portion 13A, and a fixing member 115 is provided instead of the fixing member 114. The other configuration of the pressure application device 10B is the same as that of the pressure application device 10A, and thus, the detailed description will be omitted.

The fixing member 115 is mainly different from the fixing member 114 in that a through hole 115a is formed. The other configuration of the fixing member 115 is the same as that of the fixing member 114. The biasing portion 13B includes a tank 131, a hose 132, and a pressure meter 133. In the tank 131, for example, high-pressure air is stored. One end of the hose 132 is connected to the tank 131. The other end of the hose 132 is connected to the through hole 115a of the fixing member 115. The pressure meter 133 is connected to the hose 132. The biasing portion 13B fills the inside of the cylindrical body 112 with the high-pressure air through the through hole 115a of the fixing member 115. Accordingly, the biasing portion 13B applies a load to the contact portion 12A. The biasing portion 13B applies a load to the surface Sa of the measurement target S in the through hole 32d via the contact portion 12A. The biasing portion 13B adjusts the pressure of the high-pressure air that is supplied to the inside of the cylindrical body 112, and thus, is capable of adjusting the load that is applied to the contact portion 12. Accordingly, the biasing portion 13B is capable of adjusting the magnitude of the pressure that is applied to the measurement target S.

In addition, an example has been described in which in the measurement target S, the anhydrate is transitioned to the hydrate during the measurement period, but in the measurement target S, for example, the hydrate (for example, a theophylline hydrate) may be transitioned to the anhydrate (for example, a theophylline anhydrate) during the measurement period. That is, the measurement target S may be accompanied by a dehydration reaction of the hydrate. In addition, in the measurement target S, for example, a plurality of molecules (for example, phenazine and a mesaconic acid) may be crystallized by a hydrogen bond during the measurement period. That is, the measurement target S may be accompanied by co-crystallization. In addition, in the measurement target S, for example, a solvent may be incorporated into a crystalline structure during the measurement period. That is, the measurement target S may be accompanied by solvation (for example, solvation of cortisone acetate by ethanol, and the like). In addition, in the measurement target S, for example, a carbamazepine type III may be transitioned to a carbamazepine type I. That is, the measurement target S may be in a crystalline polymorph (having the same molecules but different arrangement of the molecules in the crystals). In addition, in the measurement target S, for example, water may be adsorbed onto a porous material (for example, activated carbon).

In addition, an example has been described in which the volume of the measurement target S decreases during the measurement period, but the volume of the measurement target S may increase during the measurement period.

In addition, the ATR device 1 may further include a temperature adjustment unit adjusting the temperature of the measurement target S. In the second step of the ATR method, the temperature of the measurement target S may be adjusted during the measurement period. Accordingly, the temperature of the measurement target S can be constant during the measurement period. For this reason, a temporal change in the measurement target S can be measured in a predetermined condition. Therefore, the information relevant to the measurement target S can be acquired with excellent reproducibility.

In addition, the ATR device 1 may not include the chopper 23. In this case, for example, a photoconductive antenna in which a voltage to be applied is modulated is used as the terahertz wave generating element 24. In addition, the ATR device 1 may not include both of the chopper 23 and the lock-in amplifier 76. In addition, an example has been described in which the terahertz wave T is continuously incident on the reflection surface 30c, and the terahertz wave T reflected on the reflection surface 30c is continuously detected, during the measurement period, but the terahertz wave T may be intermittently incident on the reflection surface 30c, and the terahertz wave T reflected on the reflection surface 30c may be intermittently detected, during the measurement period.

In addition, an example has been described in which in the ATR device 1, the substantially constant pressure is applied to the measurement target S during the measurement period, but the magnitude of the pressure that is applied to the measurement target S may be increased or decreased during the measurement period. Specifically, for example, the weight of the biasing portion 13 of the pressure application device 10 may be increased or decreased during the measurement period. Alternatively, the pressure of the high-pressure air that is supplied to the inside of the cylindrical body 112 may be increased or decreased during the measurement period, in accordance with the biasing portion 13B of the pressure application device 10B.

In addition, an example has been described in which the processing unit 80 acquires the information relevant to the measurement target S on the basis of the plurality of electrical field waveforms of the terahertz waves T that are acquired by the detection unit 70, but the processing unit 80 may not acquire the information relevant to the measurement target S. Similarly, an example has been described in which the ATR method includes step S6 of acquiring the information relevant to the measurement target S on the basis of the plurality of electrical field waveforms of the terahertz waves T that are acquired in step S4, but the ATR method may not include step S6.

In addition, an example has been described in which the prism 30 includes the incidence surface 30a, the exit surface 30b, the reflection surface 30c, the first secondary reflection surface 30d, and the second secondary reflection surface 30e, but the prism 30 may have a triangular cross-section. That is, the prism 30 may include the incidence surface 30a, the exit surface 30b, and the reflection surface 30c, but may not include the first secondary reflection surface 30d and the second secondary reflection surface 30e. In this case, in the prism 30, the incidence surface 30a functions as the incidence surface and the first secondary reflection surface, and the exit surface 30b functions as the exit surface and the second secondary reflection surface.

In addition, an example has been described in which the light source 21 outputs light by the pulsed oscillation, but the light source 21 may continuously output light. That is, the light source 21 may be a continuous wave (CW) light source.

Figure 15:
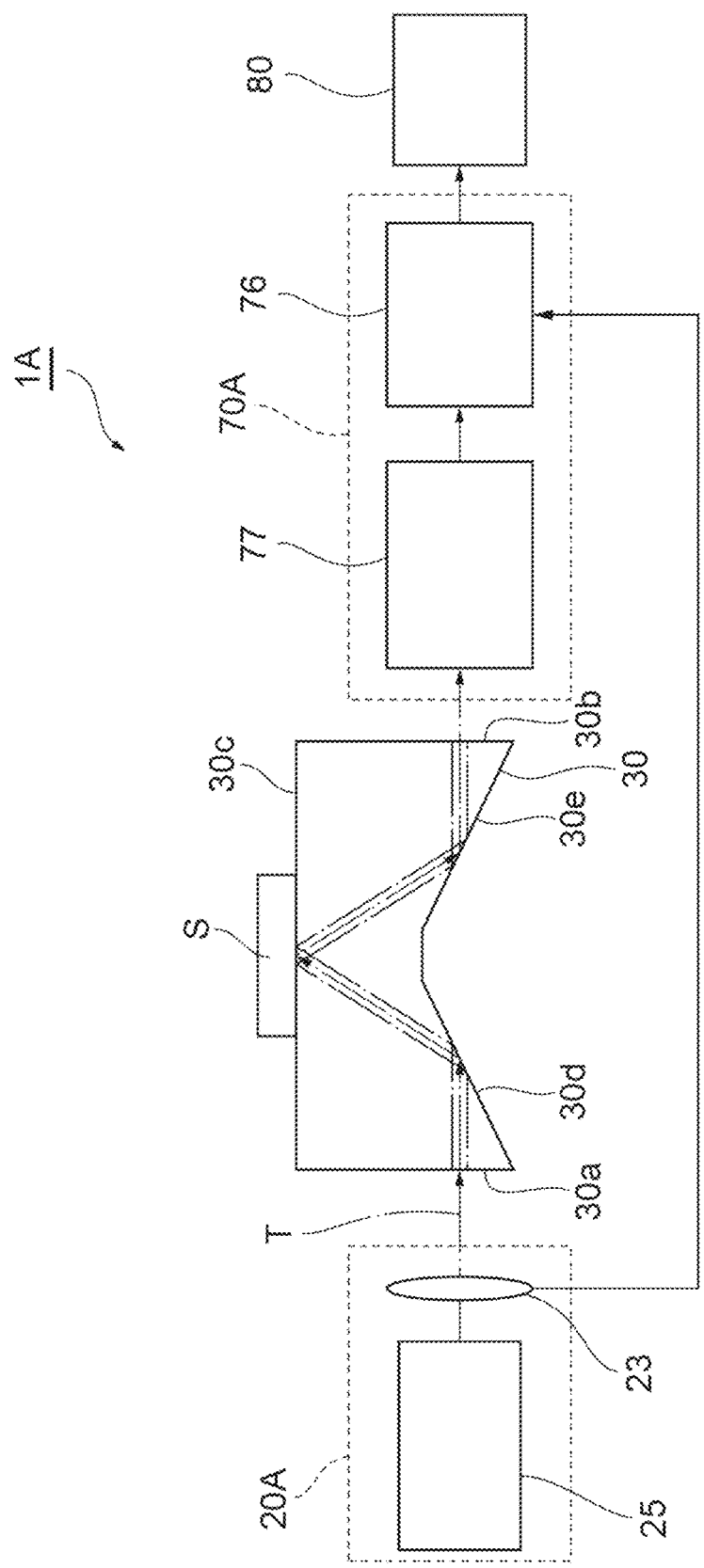
FIG. 15 is a configuration diagram of a terahertz wave attenuated total reflection spectroscopic device of a modification example.

In addition, as illustrated in FIG. 15, an ATR device 1A may include an output unit 20A instead of the output unit 20, and may include a detection unit 70A instead of the detection unit 70. The ATR device 1A may not include the optical path length difference adjustment unit 40, the polarizer 50, and the multiplexing unit 60. The output unit 20A includes a terahertz wave light source 25 and the chopper 23. The terahertz wave light source 25 is a light source simultaneously oscillating the terahertz waves T of a single wavelength or a plurality of wavelengths, and for example, is a backward-wave tube, a quantum cascade laser, or the like. The chopper 23 alternately repeats the passing and blocking of the terahertz wave T output from the terahertz wave light source 25 at a constant cycle. The terahertz wave T output from the output unit 20A is incident on the incidence surface 30a of the prism 30, is sequentially reflected on the first secondary reflection surface 30d, the reflection surface 30c, and the second secondary reflection surface 30e, and then, is output to the outside from the exit surface 30b, and is incident on the detection unit 70A.

The detection unit 70A includes a terahertz wave detector 77 and the lock-in amplifier 76. The terahertz wave detector 77, for example, is an infrared detector such as a bolometer or a Golay cell. An electrical signal output from the terahertz wave detector 77 is input to the lock-in amplifier 76. The lock-in amplifier 76 synchronously detects the electrical signal that is output from the terahertz wave detector 77 at a repetition frequency of the passing and blocking of the terahertz wave T in the chopper 23. Note that, in a case where the bolometer is used as the terahertz wave detector 77, the ATR device 1A may not include the chopper 23 and the lock-in amplifier 76.

According to the ATR device 1A, the output of the terahertz wave T before and after the measurement target S is disposed on the reflection surface 30c is acquired, and thus, the information of the measurement target S can be acquired. Specifically, in a case where the light source oscillating the terahertz wave T of a single wavelength is used as the terahertz wave light source 25, an absorption wavelength (a frequency) at which an absorption coefficient of the measurement target S is changed in accordance with the progress of the hydration transition reaction is grasped in advance. Subsequently, the terahertz wave T of the absorption wavelength described above is incident on the reflection surface 30c, and the output of the terahertz wave T is acquired by the detection unit 70A, in a state where the measurement target S is not disposed on the reflection surface 30c (reference measurement). Subsequently, the terahertz wave T of the absorption wavelength described above is incident on the reflection surface 30c, and the output of the terahertz wave T is acquired by the detection unit 70A, in a state where the measurement target S is disposed on the reflection surface 30c (sample measurement). In the sample measurement, the outputs of the plurality of terahertz waves T respectively corresponding to the plurality of times separated from each other are acquired. Subsequently, absorbances respectively corresponding to the plurality of times separated from each other are calculated on the basis of a ratio between the output of the terahertz wave T acquired in the reference measurement and each of the outputs of the plurality of terahertz waves T acquired in the sample measurement, and the information relevant to the measurement target S is acquired. Accordingly, a temporal change in the measurement target S is measured.

In addition, an optical interferometry may be used as an optical system of the detection units 70 and 70A. In this case, the plurality of electrical field waveforms of the terahertz waves T is not acquired by the detection units 70 and 70A, but the spectra (spectroscopy data) of the plurality of terahertz waves T can be directly acquired by the detection units 70 and 70A. Then, the information of the measurement target S can be acquired on the basis of the plurality of spectra. As described above, a plurality of detection results that are acquired by the detection units 70 and 70A (in step S4) are the plurality of electrical field waveforms of the terahertz waves T, the plurality of outputs of the terahertz waves T, the plurality of spectra, or the like. The plurality of detection results may indicate predetermined information items of the measurement target S respectively corresponding to the plurality of times separated from each other.

A terahertz wave attenuated total reflection spectroscopic method of one aspect of the present disclosure, includes: a first step of disposing measurement target of which a volume is changed during a measurement period on a reflection surface; and a second step of acquiring data including a plurality of detection results respectively corresponding to a plurality of times separated from each other during the measurement period by allowing a terahertz wave to be incident on the reflection surface from a side opposite to the measurement target and by detecting the terahertz wave reflected on the reflection surface, during the measurement period. In the second step, a state in which a substantially constant pressure is applied to the measurement target disposed on the reflection surface is maintained during the measurement period.

In such a terahertz wave attenuated total reflection spectroscopic method, the state in which the substantially constant pressure is applied to the measurement target disposed on the reflection surface is maintained during the measurement period, and in such the state, the terahertz wave is incident on the reflection surface from a side opposite to the measurement target, and the terahertz wave reflected on the reflection surface is detected. Accordingly, a change in a pressure generated in the measurement target due to a change in the volume of the measurement target during the measurement period is prevented. For this reason, even in a case where the volume of the measurement target is changed during the measurement period, a pressure condition is maintained in a predetermined condition during the measurement period. Accordingly, according to such a terahertz wave attenuated total reflection spectroscopic method, even in the case of the measurement target of which the volume is changed during the measurement period, information relevant to the measurement target can be acquired with excellent reproducibility.

The terahertz wave attenuated total reflection spectroscopic method of one aspect of the present disclosure, may further include: a third step of acquiring information relevant to the measurement target on the basis of the plurality of detection results acquired in the second step. Accordingly, the information relevant to the measurement target can be easily acquired with excellent reproducibility.

In the terahertz wave attenuated total reflection spectroscopic method of one aspect of the present disclosure, in the second step, the terahertz wave may be incident on the reflection surface, and the terahertz wave reflected on the reflection surface may be detected, after a predetermined period elapses from a start of the application of the substantially constant pressure with respect to the measurement target disposed on the reflection surface. Accordingly, the information relevant to the measurement target can be acquired with more excellent reproducibility.

In the terahertz wave attenuated total reflection spectroscopic method of one aspect of the present disclosure, in the measurement target, an anhydrate may be transitioned to a hydrate during the measurement period. Accordingly, information relevant to hydration transition of the anhydrate can be acquired with excellent reproducibility.

In the terahertz wave attenuated total reflection spectroscopic method of one aspect of the present disclosure, the anhydrate may be a powder. Accordingly, information relevant to hydration transition of the powder can be acquired with excellent reproducibility.

In the terahertz wave attenuated total reflection spectroscopic method of one aspect of the present disclosure, the volume of the measurement target may decrease during the measurement period. Accordingly, even in the case of the measurement target of which the volume decreases during the measurement period, the information relevant to the measurement target can be acquired with excellent reproducibility.

In the terahertz wave attenuated total reflection spectroscopic method of one aspect of the present disclosure, in the second step, a temperature of the measurement target may be adjusted. Accordingly, a temperature condition may be maintained in a predetermined condition during the measurement period. For this reason, the information relevant to the measurement target can be acquired with more excellent reproducibility.

A terahertz wave attenuated total reflection spectroscopic device of one aspect of the present disclosure, includes: a terahertz wave output unit outputting a terahertz wave; a prism including a reflection surface on which a measurement target is disposed, allowing the terahertz wave output from the terahertz wave output unit to be incident on the reflection surface from a side opposite to the measurement target, and outputting the terahertz wave reflected on the reflection surface; a terahertz wave detection unit detecting the terahertz wave output from the prism; and a pressure application unit applying a pressure to the measurement target disposed on the reflection surface, in which the pressure application unit is configured to be capable of adjusting a magnitude of the pressure.

In such a terahertz wave attenuated total reflection spectroscopic device, the pressure application unit is configured to be capable of adjusting the magnitude of the pressure that is applied to the measurement target disposed on the reflection surface. Accordingly, for example, the magnitude of the pressure is adjusted such that the pressure that is applied to the measurement target disposed on the reflection surface is substantially constant, and thus, a state in which a substantially constant pressure is applied to the measurement target can be maintained during the measurement period, and in such the state, the terahertz wave can be incident on the reflection surface from a side opposite to the measurement target, and the terahertz wave reflected on the reflection surface can be detected. Accordingly, a change in a pressure generated in the measurement target due to a change in the volume of the measurement target during the measurement period is prevented. For this reason, even in a case where the volume of the measurement target is changed during the measurement period, a pressure condition is maintained in a predetermined condition during the measurement period. Accordingly, according to such a terahertz wave attenuated total reflection spectroscopic device, even in the case of the measurement target of which the volume is changed during the measurement period, the information relevant to the measurement target can be acquired with excellent reproducibility.

In the terahertz wave attenuated total reflection spectroscopic device of one aspect of the present disclosure, the pressure application unit may apply a substantially constant pressure to the measurement target disposed on the reflection surface during the measurement period. Accordingly, as described above, even in the case of the measurement target of which the volume is changed during the measurement period, the information relevant to the measurement target can be acquired with excellent reproducibility.

The terahertz wave attenuated total reflection spectroscopic device of one aspect of the present disclosure, may further include: a frame body disposed on the reflection surface, inside which the measurement target is disposed, in which the pressure application unit may include a weight applying a load to a surface of the measurement target on a side opposite to the reflection surface inside the frame body. Accordingly, a desired pressure can be applied to the measurement target disposed on the reflection surface by a simple configuration.

The terahertz wave attenuated total reflection spectroscopic device of one aspect of the present disclosure, may further include: a processing unit electrically connected to the terahertz wave detection unit, in which the processing unit may acquire information relevant to the measurement target on the basis of a plurality of detection results respectively corresponding to a plurality of times separated from each other that are acquired by the terahertz wave detection unit. Accordingly, the information relevant to the measurement target can be easily acquired with excellent reproducibility.

A pressure application device of one aspect of the present disclosure is a pressure application device used in a terahertz wave attenuated total reflection spectroscopic device that allows a terahertz wave to be incident on a reflection surface from a side opposite to a measurement target and detects the terahertz wave reflected on the reflection surface, in a state in which the measurement target is disposed inside a frame body disposed on the reflection surface, and includes: a support portion attached to the reflection surface and the frame body; a contact portion supported by the support portion to be movable along a direction perpendicular to a surface of the measurement target on a side opposite to the reflection surface and in contact with the surface of the measurement target inside the frame body; and a biasing portion biasing the contact portion against the reflection surface side along the direction perpendicular to the surface of the measurement target.

By using such a pressure application device in the terahertz wave attenuated total reflection spectroscopic device, for example, a state in which a substantially constant pressure is applied to the measurement target can be maintained during the measurement period, and in such the state, the terahertz wave can be incident on the reflection surface from a side opposite to the measurement target, and the terahertz wave reflected on the reflection surface can be detected. Accordingly, a change in a pressure generated in the measurement target due to a change in the volume of the measurement target during the measurement period is prevented. For this reason, even in a case where the volume measurement target is changed during the measurement period, a pressure condition is maintained in a predetermined condition during the measurement period. Accordingly, according to such a pressure application device, even in the case of the measurement target of which the volume is changed during the measurement period, the information relevant to the measurement target can be acquired with excellent reproducibility.

In the pressure application device of one aspect of the present disclosure, the biasing portion may include a weight. Accordingly, the substantially constant pressure can be applied to the measurement target disposed on the reflection surface by a simple configuration.

In the pressure application device of one aspect of the present disclosure, the direction perpendicular to the surface of the measurement target may be a vertical direction, and a space in which the weight is disposed may be formed in the contact portion. Accordingly, the weight can be stably supported by the contact portion. For this reason, the pressure can be stably applied to the measurement target disposed on the reflection surface.

In the pressure application device of one aspect of the present disclosure, the support portion may include a cylindrical body extending along the direction perpendicular to the surface of the measurement target, and the contact portion may be disposed inside the cylindrical body. Accordingly, the pressure can be stably applied to the measurement target disposed on the reflection surface by a simple configuration.

In the pressure application device of one aspect of the present disclosure, the support portion may be fixed to the reflection surface in a state in which the support portion is in contact with the frame body. Accordingly, the support portion is brought close to the frame body, and thus, the contact portion can be supported in a position close to the frame body. For this reason, the pressure can be stably applied to the measurement target disposed on the reflection surface.

According to the present disclosure, it is possible to provide a terahertz wave attenuated total reflection spectroscopic method, a terahertz wave attenuated total reflection spectroscopic device, and a pressure application device, in which even in the case of a measurement target of which the volume is changed during a measurement period, information relevant to the measurement target can be acquired with excellent reproducibility.

What is claimed is:

1. A terahertz wave attenuated total reflection spectroscopic method, comprising:
   a first step of disposing a measurement target of which a volume is changed during a measurement period on a reflection surface; and
   a second step of acquiring data including a plurality of detection results respectively corresponding to a plurality of times separated from each other during the measurement period by allowing a terahertz wave to be incident on the reflection surface from a side opposite to the measurement target and by detecting the terahertz wave reflected on the reflection surface, during the measurement period,
   wherein in the second step, a state in which a substantially constant pressure is applied to the measurement target disposed on the reflection surface is maintained during the measurement period.

2. The terahertz wave attenuated total reflection spectroscopic method according to claim 1, further comprising:
   a third step of acquiring information relevant to the measurement target on the basis of the plurality of detection results acquired in the second step.

3. The terahertz wave attenuated total reflection spectroscopic method according to claim 1,
   wherein in the second step, the terahertz wave is incident on the reflection surface, and the terahertz wave reflected on the reflection surface is detected, after a predetermined period elapses from a start of the application of the substantially constant pressure with respect to the measurement target disposed on the reflection surface.

4. The terahertz wave attenuated total reflection spectroscopic method according to claim 1,
   wherein in the measurement target, an anhydrate is transitioned to a hydrate during the measurement period.

5. The terahertz wave attenuated total reflection spectroscopic method according to claim 4,
   wherein the anhydrate is a powder.

6. The terahertz wave attenuated total reflection spectroscopic method according to claim 1,
   wherein the volume of the measurement target decreases during the measurement period.

7. The terahertz wave attenuated total reflection spectroscopic method according to claim 1,
   wherein in the second step, a temperature of the measurement target is adjusted.

8. A terahertz wave attenuated total reflection spectroscopic device, comprising:
   a terahertz wave output unit outputting a terahertz wave;
   a prism including a reflection surface on which a measurement target is disposed, allowing the terahertz wave output from the terahertz wave output unit to be incident on the reflection surface from a side opposite to the measurement target, and outputting the terahertz wave reflected on the reflection surface;
   a terahertz wave detection unit detecting the terahertz wave output from the prism; and
   a pressure application unit applying a pressure to the measurement target disposed on the reflection surface,
   wherein the pressure application unit is configured to be capable of adjusting a magnitude of the pressure.

9. The terahertz wave attenuated total reflection spectroscopic device according to claim 8,
   wherein the pressure application unit applies a substantially constant pressure to the measurement target disposed on the reflection surface during a measurement period.

10. The terahertz wave attenuated total reflection spectroscopic device according to claim 9, further comprising:
    a frame body disposed on the reflection surface, inside which the measurement target is disposed,
    wherein the pressure application unit includes a weight applying a load to a surface of the measurement target on a side opposite to the reflection surface inside the frame body.

11. The terahertz wave attenuated total reflection spectroscopic device according to claim 8, further comprising:
    a processing unit electrically connected to the terahertz wave detection unit, wherein the processing unit acquires information relevant to the measurement target on the basis of a plurality of detection results respectively corresponding to a plurality of times separated from each other that are acquired by the terahertz wave detection unit.

12. A pressure application device used in a terahertz wave attenuated total reflection spectroscopic device that allows a terahertz wave to be incident on a reflection surface from a side opposite to a measurement target and detects the terahertz wave reflected on the reflection surface, in a state in which the measurement target is disposed inside a frame body disposed on the reflection surface, the device comprising:
- a support portion attached to the reflection surface and the frame body;
- a contact portion supported by the support portion to be movable along a direction perpendicular to a surface of the measurement target on a side opposite to the reflection surface and in contact with the surface of the measurement target inside the frame body; and
- a biasing portion biasing the contact portion against the reflection surface side along the direction perpendicular to the surface of the measurement target.

13. The pressure application device according to claim 12, wherein the biasing portion includes a weight.

14. The pressure application device according to claim 13, wherein the direction perpendicular to the surface of the measurement target is a vertical direction, and
a space in which the weight is disposed is formed in the contact portion.

15. The pressure application device according to claim 12, wherein the support portion includes a cylindrical body extending along the direction perpendicular to the surface of the measurement target, and
the contact portion is disposed inside the cylindrical body.

16. The pressure application device according to claim 12, wherein the support portion is fixed to the reflection surface in a state in which the support portion is in contact with the frame body.

* * * * *